United States Patent
Hamrin et al.

(10) Patent No.: US 9,133,918 B2
(45) Date of Patent: Sep. 15, 2015

(54) CONTINUOUSLY VARIABLE TRANSMISSION WITH DIFFERENTIAL CONTROLLING ASSEMBLIES

(71) Applicant: Team Industries, Inc., Bagley, MN (US)

(72) Inventors: John E. Hamrin, Bemidji, MN (US); Bruce H. Younggren, Bemidji, MN (US); Joel Dunlap, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 30 days.

(21) Appl. No.: 13/803,815

(22) Filed: Mar. 14, 2013

(65) Prior Publication Data
US 2014/0274535 A1    Sep. 18, 2014

(51) Int. Cl.
F16H 13/06      (2006.01)
F16H 15/50      (2006.01)
F16H 61/664     (2006.01)
F16H 37/08      (2006.01)

(52) U.S. Cl.
CPC .............. F16H 15/50 (2013.01); F16H 37/086 (2013.01); F16H 61/6649 (2013.01)

(58) Field of Classification Search
CPC ... F16H 15/50; F16H 37/086; F16H 61/6649; F16H 15/503
USPC .......................................... 475/197, 189, 195
See application file for complete search history.

(56) References Cited

U.S. PATENT DOCUMENTS

| | | | |
|---|---|---|---|
| 2,526,435 A | 10/1950 | Teigman | |
| 2,727,396 A | 12/1955 | Haugwitz | |
| 4,270,415 A | 6/1981 | Dickinson et al. | |
| 4,297,918 A * | 11/1981 | Perry | 476/10 |
| 4,345,486 A | 8/1982 | Olesen | |
| 4,391,156 A | 7/1983 | Tibbals, Jr. | |
| 5,607,372 A * | 3/1997 | Lohr | 475/216 |
| 6,120,399 A | 9/2000 | Okeson et al. | |
| 6,322,475 B2 | 11/2001 | Miller | |
| 6,409,625 B1 * | 6/2002 | Sakai et al. | 475/208 |

(Continued)

FOREIGN PATENT DOCUMENTS

WO    WO 02/088573 A2    11/2002

OTHER PUBLICATIONS

Notice of Allowance (PTO-892) Notice of References cited. U.S. Appl. No. 13/828,046, mailed Jun. 16, 2014, 9 pages.

(Continued)

Primary Examiner — David J Hlavka
(74) Attorney, Agent, or Firm — IPLM Group, P.A.

(57) ABSTRACT

A continuously variable transmission that includes an input assembly, an output assembly, an input/output planetary ratio assembly and a torque feedback control is provided. The input assembly is coupled to receive input rotational motion. The output assembly is rotationally coupled to a load. The input/output planetary ratio assembly sets an input to output speed ratio. The input/output ratio assembly has a first portion that is in rotational communication with the input assembly and a second portion that is in rotational communication with the output assembly. The torque feedback control assembly provides an axial load force in response to a torque of a load coupled to the output assembly. A differential assembly sets the input to output speed ratio of the input/output planetary ratio assembly based at least in part on an axial load force of the torque feedback control assembly.

21 Claims, 35 Drawing Sheets

(56) References Cited

U.S. PATENT DOCUMENTS

| | | | |
|---|---|---|---|
| 6,569,043 B2 | 5/2003 | Younggren et al. | |
| 6,733,406 B2 | 5/2004 | Kitai et al. | |
| 6,813,553 B2 | 11/2004 | Nakamura et al. | |
| 7,074,154 B2 | 7/2006 | Miller | |
| 7,204,777 B2 | 4/2007 | Miller et al. | |
| 7,581,467 B2 | 9/2009 | Peterman et al. | |
| 7,727,106 B2 | 6/2010 | Maheu et al. | |
| 7,762,919 B2 | 7/2010 | Smithson et al. | |
| 7,762,920 B2 | 7/2010 | Smithson et al. | |
| 7,770,674 B2 | 8/2010 | Miles et al. | |
| 7,963,880 B2 | 6/2011 | Smithson et al. | |
| 7,976,426 B2 | 7/2011 | Smithson et al. | |
| 8,087,482 B2 | 1/2012 | Miles et al. | |
| 8,360,917 B2 | 1/2013 | Nichols et al. | |
| 8,496,551 B2 | 7/2013 | Mueller et al. | |
| 8,585,528 B2 | 11/2013 | Carter et al. | |
| 8,668,623 B2 | 3/2014 | Vuksa et al. | |
| 2002/0123400 A1 | 9/2002 | Younggren et al. | |
| 2004/0171452 A1* | 9/2004 | Miller et al. | 475/215 |
| 2004/0224808 A1* | 11/2004 | Miller et al. | 475/21 |
| 2005/0164818 A1* | 7/2005 | Kimura et al. | 475/59 |
| 2007/0270265 A1 | 11/2007 | Miller et al. | |
| 2007/0270267 A1 | 11/2007 | Miller et al. | |
| 2007/0270272 A1 | 11/2007 | Miller et al. | |
| 2007/0270278 A1 | 11/2007 | Miller et al. | |
| 2009/0132135 A1* | 5/2009 | Quinn et al. | 701/55 |
| 2009/0164076 A1 | 6/2009 | Vasiliotis et al. | |
| 2010/0056322 A1 | 3/2010 | Thomassy | |
| 2010/0093479 A1* | 4/2010 | Carter et al. | 475/159 |
| 2010/0093480 A1 | 4/2010 | Pohl et al. | |
| 2010/0267510 A1 | 10/2010 | Nichols et al. | |
| 2010/0314184 A1 | 12/2010 | Stenberg et al. | |
| 2011/0034284 A1 | 2/2011 | Pohl et al. | |
| 2011/0088503 A1 | 4/2011 | Armstrong et al. | |
| 2011/0092325 A1 | 4/2011 | Vuksa et al. | |
| 2011/0172050 A1 | 7/2011 | Nichols et al. | |
| 2011/0220453 A1 | 9/2011 | Mueller et al. | |
| 2012/0115667 A1 | 5/2012 | Lohr et al. | |
| 2012/0238386 A1 | 9/2012 | Pohl et al. | |

OTHER PUBLICATIONS

Search Report/ Written Opinion of International Application Serial No. PCT/US2014/021849 mailed Jun. 4, 2014.

Search Report/ Written Opinion of International Application Serial No. PCT/US2014/021861 mailed Jun. 4, 2014.

Final Office Action, U.S. Appl. No. 13/804,287 mailed Jun. 30, 2014.

Model N360 NuVinci® CVP, Bicycle Drivetrain. Fallbrook Technologies Inc. 2010, 2 pages.

NuVinci Deltaseries Supercharger Drive. Fallbrook Technologies Inc. 2012, 2 pages.

NuVinci® N360 CVP Drivetrain Owner's Manual. Fallbrook Technologies Inc. Jul. 2010, 6 pages.

NuVinci® Parts Catalog, NuVinci N360 and NuVinci Harmony Parts Catalog—*B35-N360-12* Fallbrook Technologies Inc. 2012, 11 pages.

NuVinci® N360 Technical Manual. *B35-N360-02* Fallbrook Technologies Inc. 2012, 15 pages.

NuVinci® N360 Test Summary. Fallbrook Technologies Inc. 2010, 1 page.

NuVinci® Range and Gear Inch Comparison, NuVinci N360. Date unknown. 1 page.

Pohl, Brad, et al. "Configuration Analysis of a Spherical Traction Drive CVT/IVT". Fallbrook Technologies. Date unknown, 6 pages.

Non-Final Office Action of Corresponding U.S. Appl. No. 13/828,902 mailed on Feb. 26, 2014.

Non-Final Office Action of Corresponding U.S. Appl. No. 13/804,287 mailed on Mar. 13, 2014.

* cited by examiner

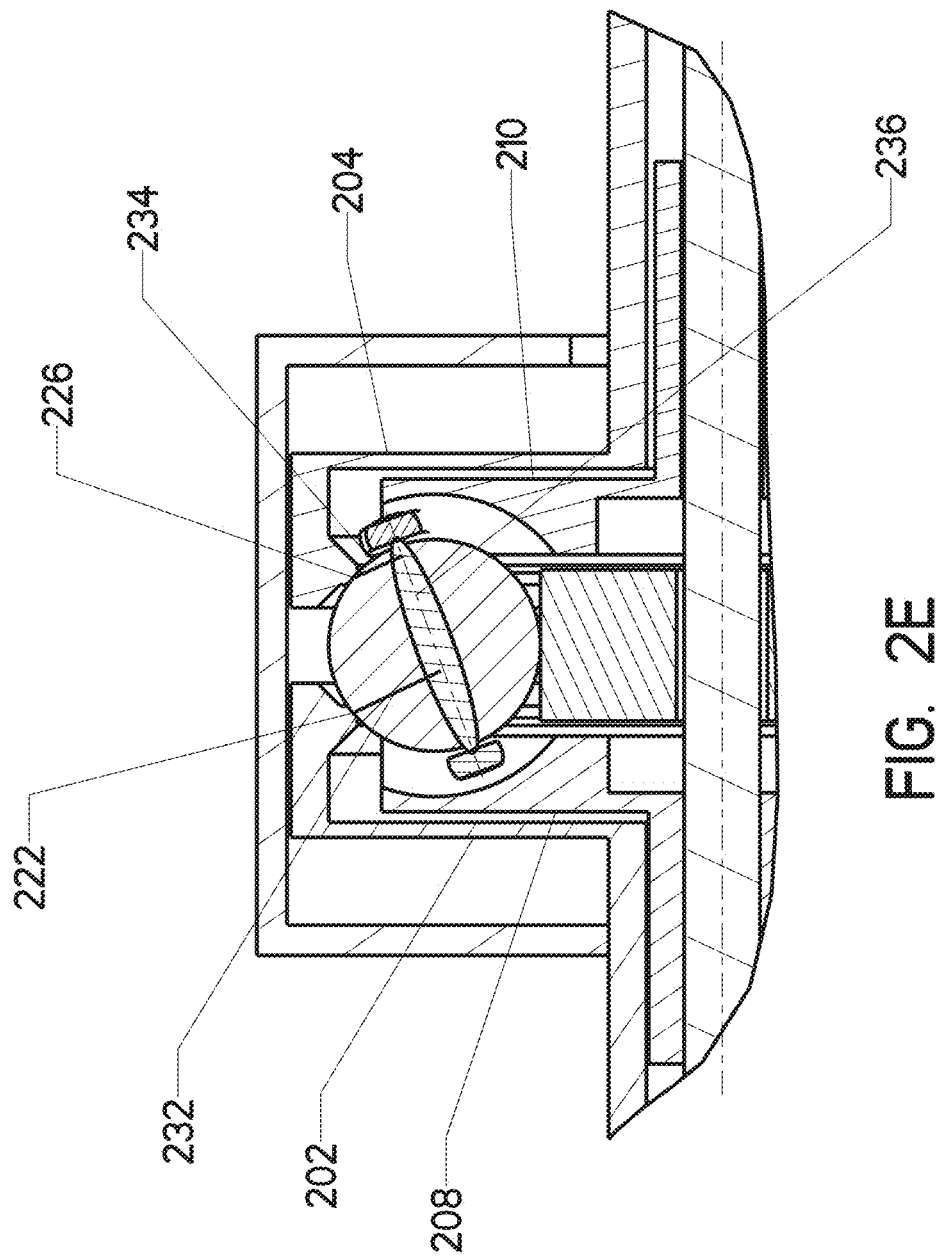

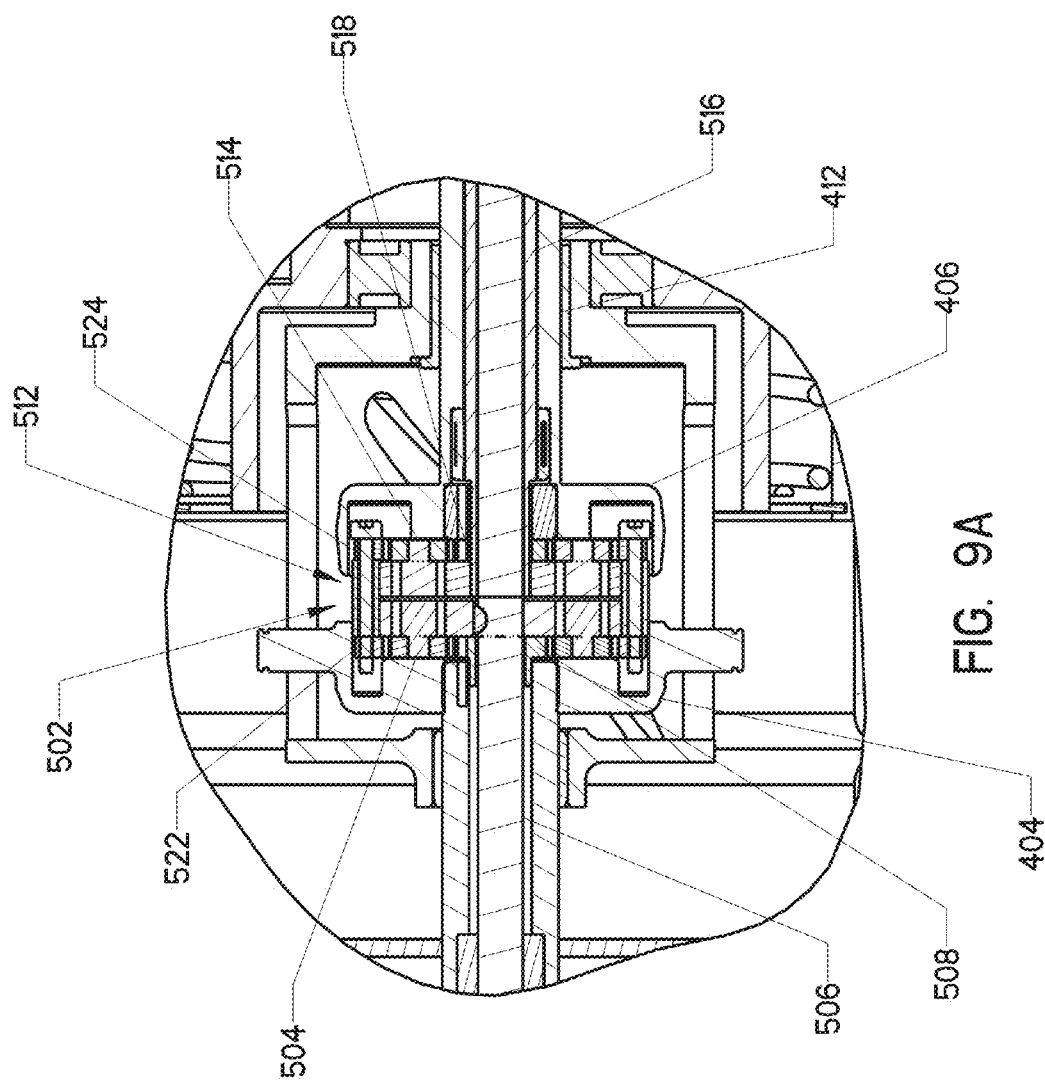

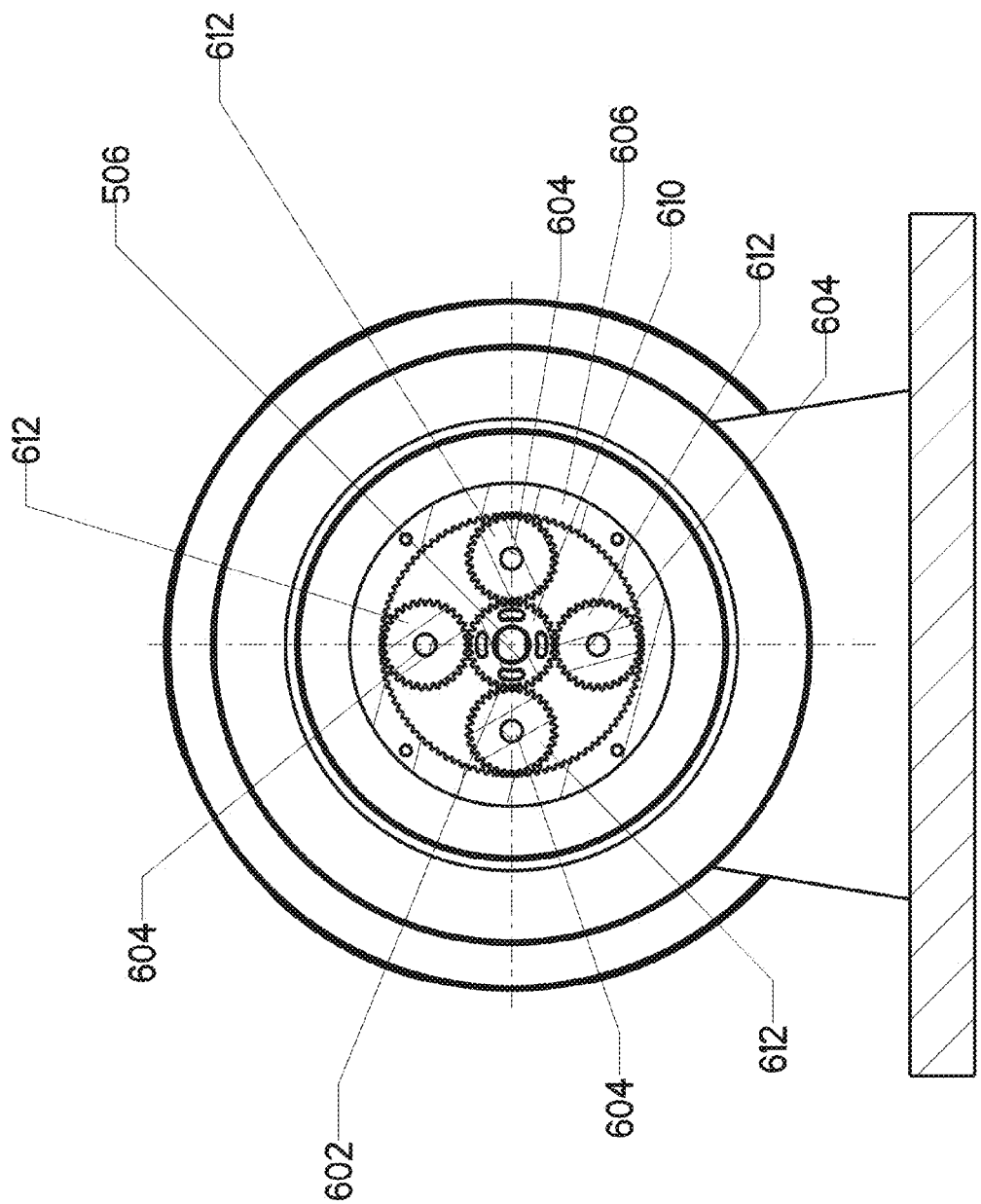

CONTINUOUSLY VARIABLE TRANSMISSION WITH DIFFERENTIAL CONTROLLING ASSEMBLIES

BACKGROUND

A continuously variable transmission (CVT) is a transmission that continuously varies a speed ratio between an output speed and an input speed. One type of a CVT is a belt-type that varies the speed ratio by varying the distance between sheaves of a pulley so the distance of the belt to a rotational axis of the pulley varies. Another type of CVT is a spherical-type that utilizes spherical speed adjusters, such as power adjusters, balls, planets, spherical gears or rollers. The spherical speed adjustors in this embodiment have tiltable axis of rotation that are adapted to be adjusted to achieve a desired ratio of input speed to output speed.

For the reasons stated above and for other reasons stated below which will become apparent to those skilled in the art upon reading and understanding the present specification, there is a need in the art for an effective and efficient method of controlling the variable shifting of a CVT.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a continuously variable transmission is provided. The continuously variable transmission includes an input assembly, an output assembly, an input/output planetary ratio assembly, a torque feedback control and a differential assembly. The input assembly is configured to be coupled to receive input rotational motion. The output assembly provides a rotational output. The output assembly is configured to be rotationally coupled to a load. The input/output planetary ratio assembly is configured and arranged to set an input to output speed ratio. The input/output ratio assembly has a first portion that is in rotational communication with the input assembly and a second portion that is in rotational communication with the output assembly. The torque feedback control assembly is configured and arranged to provide an axial load force in response to a torque of a load coupled to the output assembly. The differential assembly is configured and arranged to set the input to output speed ratio of the input/output planetary ratio assembly based at least in part on an axial load force of the torque feedback control assembly.

In another embodiment, another continuously variable transmission is provided. The continuously variable transmission includes an input assembly, an output assembly, an input/output planetary ratio assembly, a torque feedback control, an input speed feedback control assembly and a differential assembly. The input assembly is configured to be coupled to receive input rotational motion. The output assembly provides a rotational output. The output assembly is configured to be rotationally coupled to a load. The input/output planetary ratio assembly is configured and arranged to set an input to output speed ratio. The input/output ratio assembly has a first portion that is in rotational communication with the input assembly and a second portion that is in rotational communication with the output assembly. The torque feedback control assembly is configured and arranged to provide an axial load force in response to a torque of a load coupled to the output assembly. The torque feedback control assembly is coupled to provide torque feedback to the input/output planetary ratio assembly to at least in part control the input to output speed ratio of the input/output planetary ratio assembly. The input speed feedback control assembly is configured and arranged to provide an axial force in response to a rotation from the input assembly. The differential assembly is configured and arranged to set the input to output speed ratio of the input/output planetary ratio assembly based on the balancing of the axial force of the input speed feedback control assembly force with the axial force of the torque feedback control assembly.

In further another embodiment, yet another continuously variable transmission is provided. The continuously variable transmission includes an input assembly, an output assembly, an input/output planetary ratio assembly and a torque feedback control. The input assembly is configured to be coupled to receive input rotational motion. The output assembly provides a rotational output. The output assembly is configured to be rotationally coupled to a load. The input/output planetary ratio assembly is configured and arranged to set an input to output speed ratio. The input/output ratio assembly has a first portion that is in rotational communication with the input assembly and a second portion that is in rotational communication with the output assembly. The torque feedback control assembly is configured and arranged to provide an axial load force in response to a torque of a load coupled to the output assembly. The torque feedback control assembly is coupled to provide torque feedback to the input/output planetary ratio assembly to at least in part control the input to output speed ratio of the input/output planetary ratio assembly. The torque feedback control assembly further includes an input/output ratio output shaft, a cam, a first cam spider and a second cam spider. The input/output ratio output shaft is operationally coupled to the input/output ratio assembly. The cam is slidably mounted on the input/output ratio shaft. The cam is in operational communication with a movable member of the input speed feedback control assembly. The cam has at least one first track and at least one second track. The at least one first track is non-parallel with the at least one second track. The first cam spider is operationally connected to the input/output ratio output shaft. At least a portion of the first cam spider is received in the at least one first track of the cam. The first cam spider transmits torque to the cam via the at least a portion of the first cam spider in the at least one first track. The second cam spider is operationally connected to an output shaft of the output assembly. The at least a portion of the second cam spider is received in the at least one second track, wherein the second cam spider rotates relative to the first spider which operates in the at least one first track causing a phase change between first and second spiders when a change in axial position of the torque feedback control assembly occurs.

BRIEF DESCRIPTION OF THE DRAWINGS

The present invention can be more easily understood and further advantages and uses thereof will be more readily apparent, when considered in view of the detailed description and the following figures in which:

FIG. 2E is a cross-sectional side view of a portion of the input/output planetary ratio assembly of FIG. 2A with an axle axis of the ball planet set to provide a second speed ratio;

FIG. 9A is a cross-sectional side view of the differential assembly of the CVT of FIG. 6;

FIG. 14B is a cross-sectional front view of a planetary shift modifier assembly of FIG. 10;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
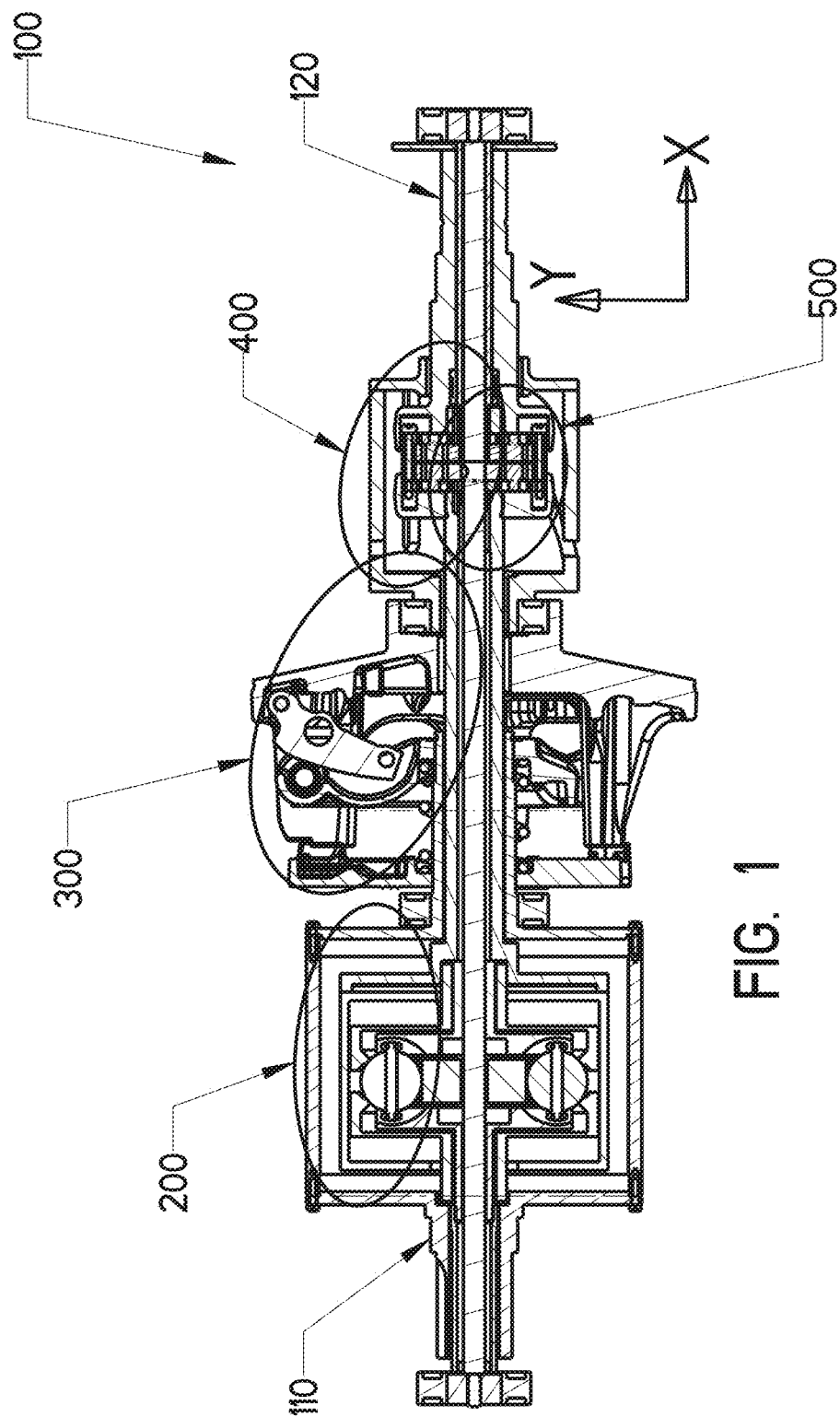
FIG. 1 is a cross-sectional diagram of a continuously variable transmission (CVT) of one embodiment of the present invention.
Figure 6:
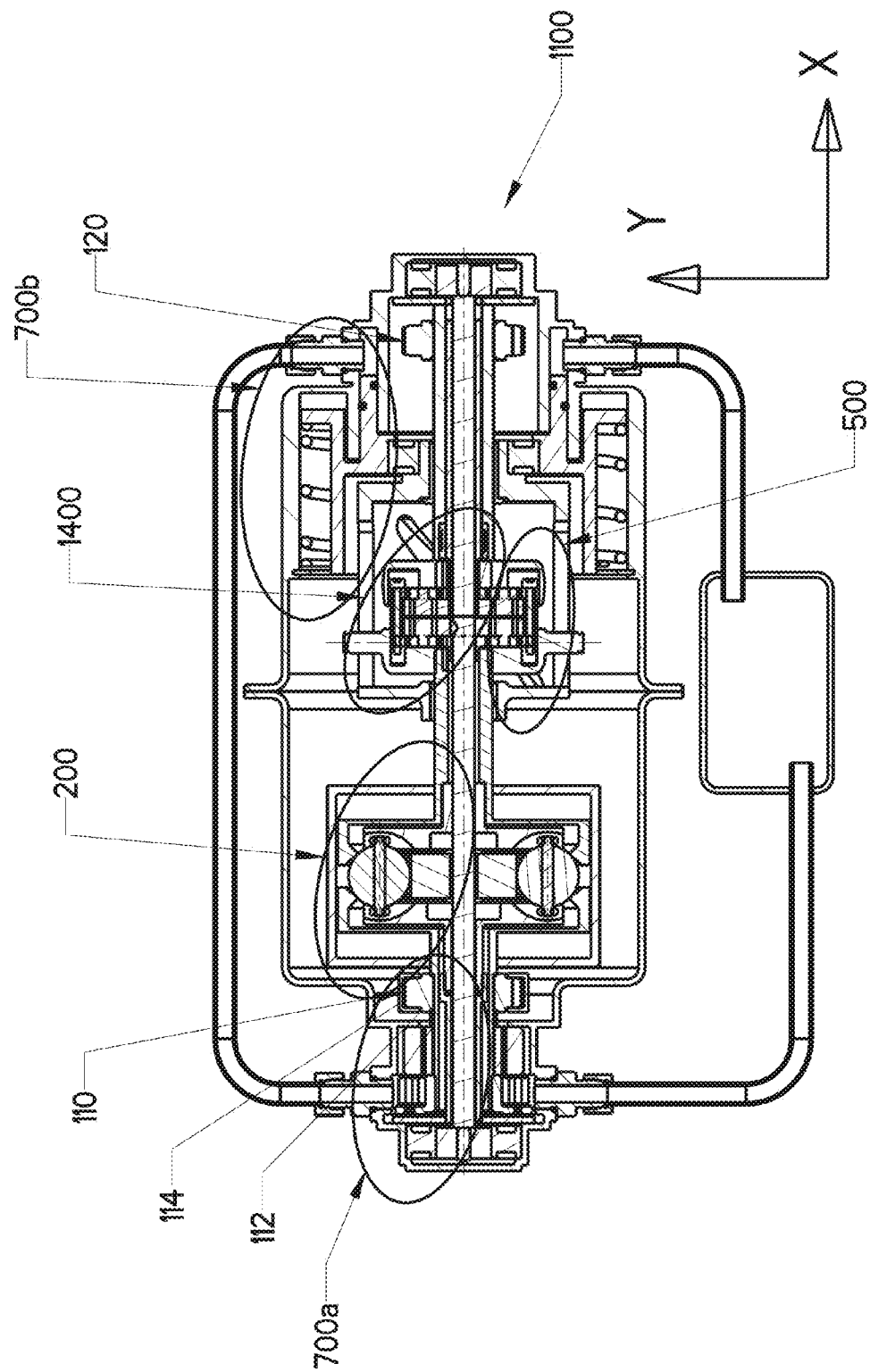
FIG. 6 is a cross-sectional diagram of a continuously variable transmission (CVT) of another embodiment of the present invention.
Figure 10:
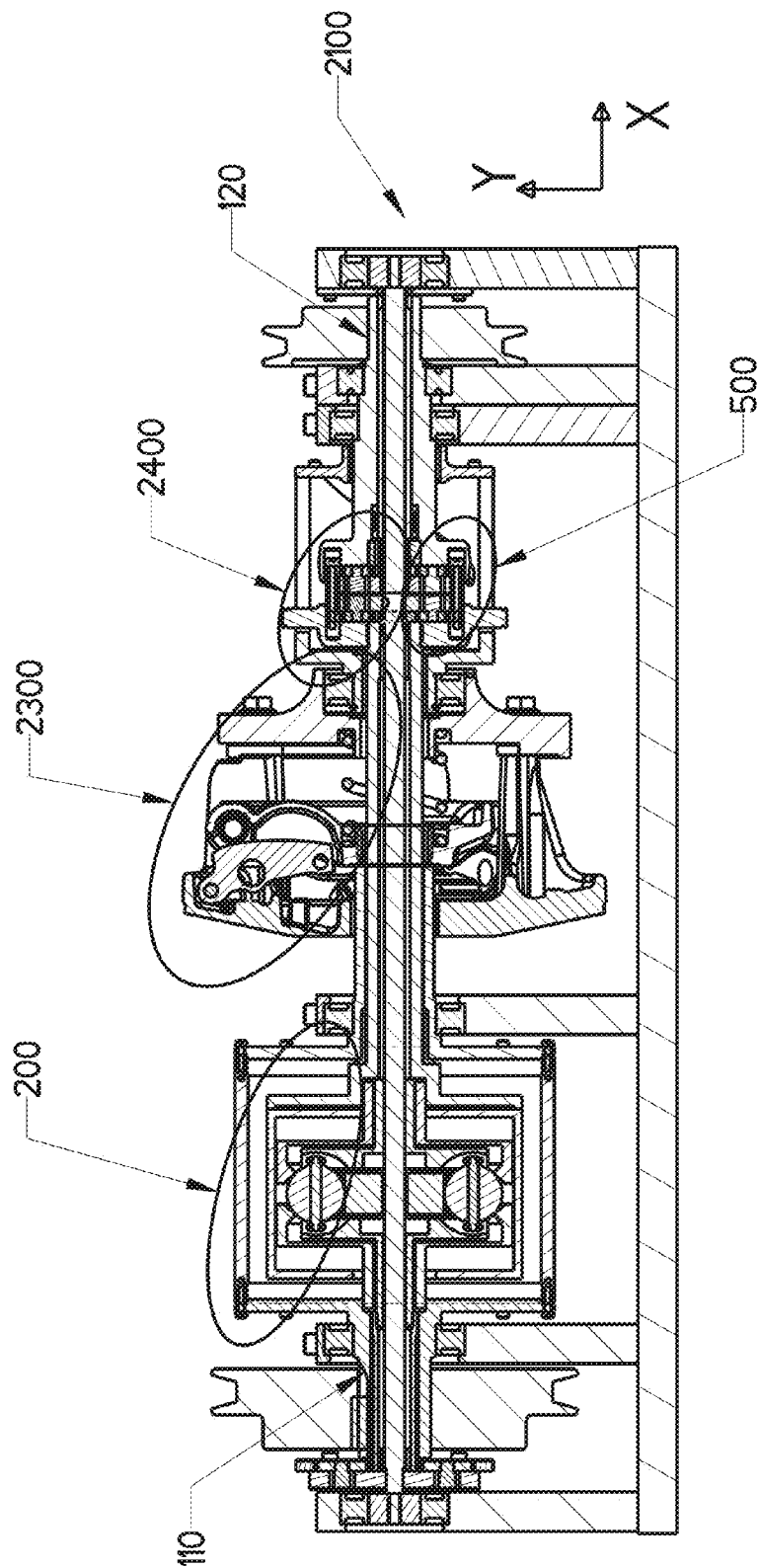
FIG. 10 is a cross-sectional diagram of a continuously variable transmission (CVT) of another embodiment of the present invention.

Embodiments of the present invention provide a continuously variable transmission (CVT). In particular, the embodiments include CVT 100, CVT 1100 and CVT 2100. Each CVT 100, 1100 and 2100 includes a novel controlling differential shifting assembly. A cross-sectional side view of the CVT 100 embodiment is illustrated in FIG. 1. A cross-sectional side view of the CVT 1100 embodiment is illustrated in FIG. 6. A cross-sectional side view of the CVT 2100 embodiment is illustrated in FIG. 10. The CVTs 100, 1100 and 2100 embodiments are also known as continuously variable planetary transmissions. Elements of CVT 100, 1100 and 2100 include an input assembly 110 which is connected directly or indirectly to a crankshaft of an engine to receive rotational motion and an output assembly 120 that is connected directly or indirectly to a load, such as, tires of a vehicle. The CVT embodiments 100, 1100 and 2100 also include an input speed feedback control assembly 300, 700 and 2300 that includes part of a shifting mechanism that is connected directly or indirectly to the crankshaft of the engine. The CVT embodiments 100, 1100 and 2100 further include a torque feedback control assembly 400, 1400 and 2400 respectively that includes part of the shifting mechanism that is connected directly or indirectly to the load. Moreover each CVT embodiment 100, 1100 and 2100 includes an input/output planetary ratio assembly 200 that transfers rotational motion from the input assembly 110 to the output assembly 120. In an embodiment, the input/output ratio assembly 200 is an input/output planetary assembly 200. Further, a differential assembly 500 is used in each CVT embodiment 100, 1100 and 2100 as part of the shifting mechanism that takes the rotational spinning of the respective torque feedback control assembly 400, 1400 and 2400 and its phase relationship of two subsequently detailed spiders to control the shifting mechanism inside the input/output planetary ratio assembly 200 of the CVT 100. The CVT 100 changes the rotation input at the input assembly 110 to a rotational output at the output assembly 120 by a select ratio. Common example ratios for CVT devices have a range of 2:1 under-drive to 0.5:1 overdrive. What this means is that if the input has 2,000 RPM and 400 ft-lbs of torque, at the 2:1 underdrive, the output will have 1,000 RPM and 800 ft-lbs of torque. Conversely at a 0.5:1 overdrive, the output will have 4,000 RPM and 200 ft-lbs of torque. These numbers are provided without consideration of efficiency losses. Also, although the ratios set out above are common examples, other ratios can be used depending on the application.

Figure 2A:
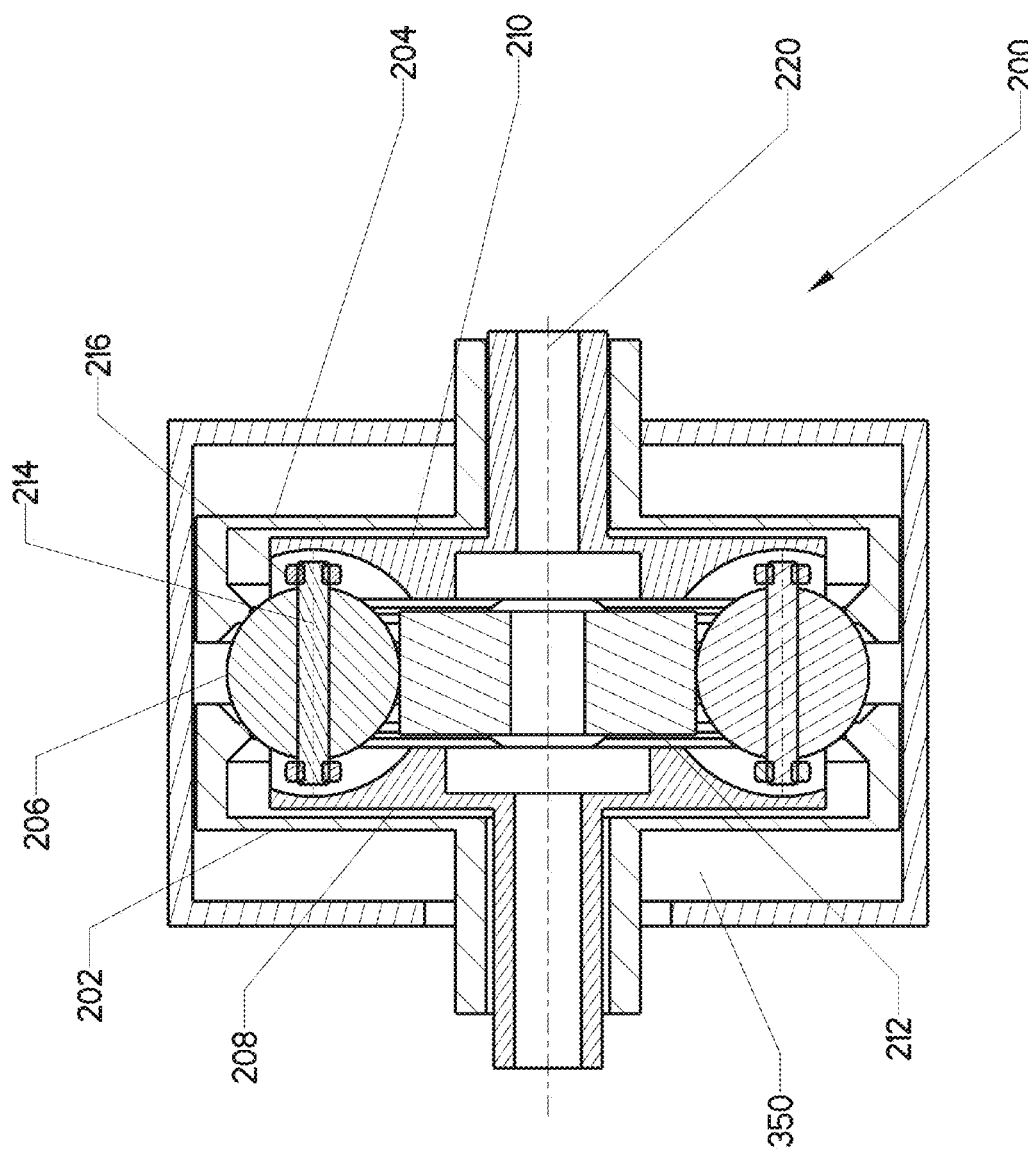
FIG. 2A is a cross-sectional side view of the input/output planetary ratio assembly of the CVT of FIG. 1.
Figure 2B:
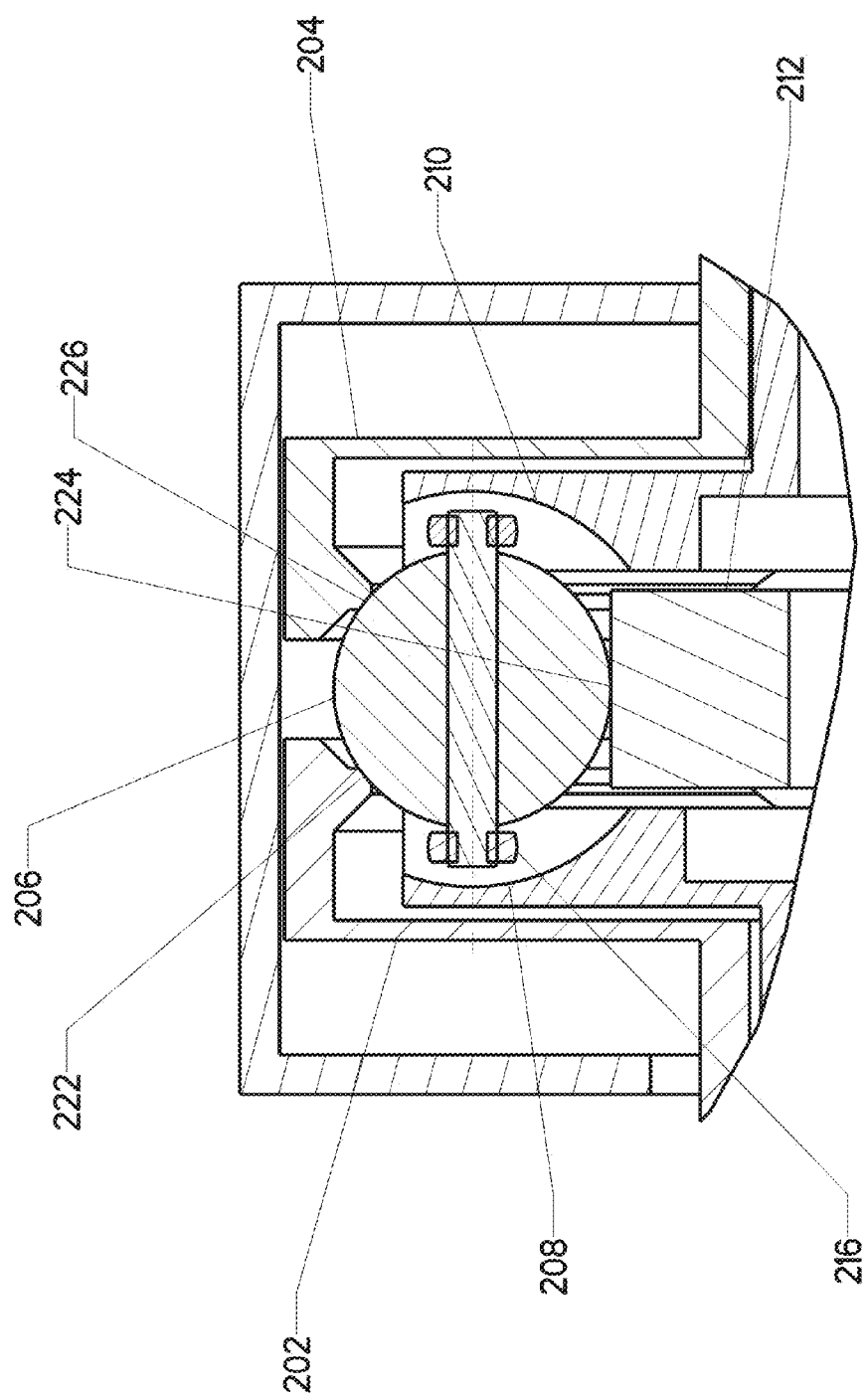
FIG. 2B is a cross-sectional side view of a portion of the input/output planetary ratio assembly of FIG. 2A.

FIG. 2A illustrates an input/output planetary ratio assembly 200 that is used in CVT 100, CVT 1100 and CVT 2100. Torque comes into the input/output planetary ratio assembly 200 from the input assembly 110 via the first traction ring 202. The input assembly portion 110 and the first traction ring 202 are operatively connected. The first traction ring 202 contacts a planet 206 at contact point 222 as illustrated in the close up view provided in FIG. 2B. The planets 206 individually spin about their axles 214 and as a group about the input/output assembly axis 220. At contact point 224, the planet 206 contacts a sun 212 and spins the sun 212 about the axis 220 of the input/output planetary ratio assembly 200. The input/output planetary ratio assembly 200 has a relatively large clamping load that clamps the two traction rings 202 and 204 together. The reaction force from this clamping load goes through the traction rings 202 and 204 into the ball planets 206 and eventually to the sun 212. With multiple planets 206 this load gets equalized about the axis 220 of the input/output planetary ratio assembly 200. At contact point 226 the ball planet 206 contacts and spins the second traction ring 204 which is operatively coupled to the output shaft 120 of the respective CVT 100, 1100 and 2100. The torque path of each CVT 100, 1100 and 2100 is from the input assembly 110 to the first traction ring 202, to the ball planet 206, then to the second traction ring 204, through the respective torque feedback control assembly 400, 1400 and 2400 (described below), and eventually out of the device through the output assembly 120. The points of contact between the parts are 222 to 224 to 226 as illustrated in the close up view of FIG. 2B. Traction fluid 350 in the input/output planetary ratio assembly 200 along with the clamping load between the traction rings 202 and 204 allows torque and RPM to be transmitted from the input assembly 110 to the output assembly 120.

Figure 2C:
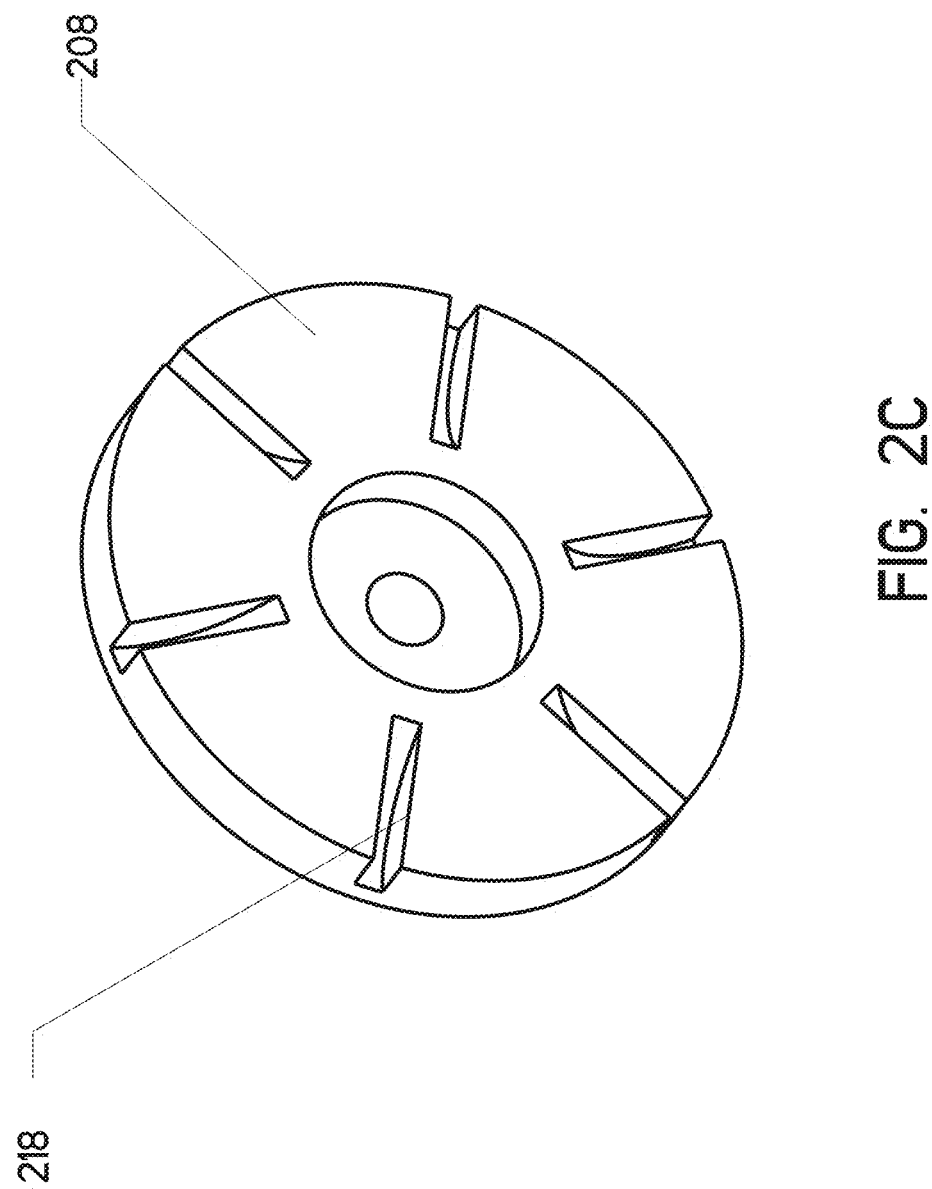
FIG. 2C is a front perspective view of a first stator of the input/output planetary ratio assembly of FIG. 2B.

As discussed above, the ball planet 206 spins about its axle 214. Bearings 216 (or rollers or caps) are positioned on ends of axle 214. The rollers 216 fit in tracks 218 (best illustrated in FIG. 2C) in a first stator 208. The second stator 210 has similar tracks that the rollers 216 fit into, but the tracks, in one embodiment, are offset from the tracks in the first stator, 208. In this embodiment, the first stator 208 is fixed to ground and does not rotate at all. The second stator 210 can rotate relative to ground and hence relative to the first stator 208. As the second stator, 210 rotates, the ball axle 214 is restricted to follow the tracks 218 in the first stator 208 and will find a new equilibrium. Thus the angle of the axle 214 changes and the axle twists and tips relative to the X, Y, Z axis of the device changing the ratio of the CVT.

Figure 2D:
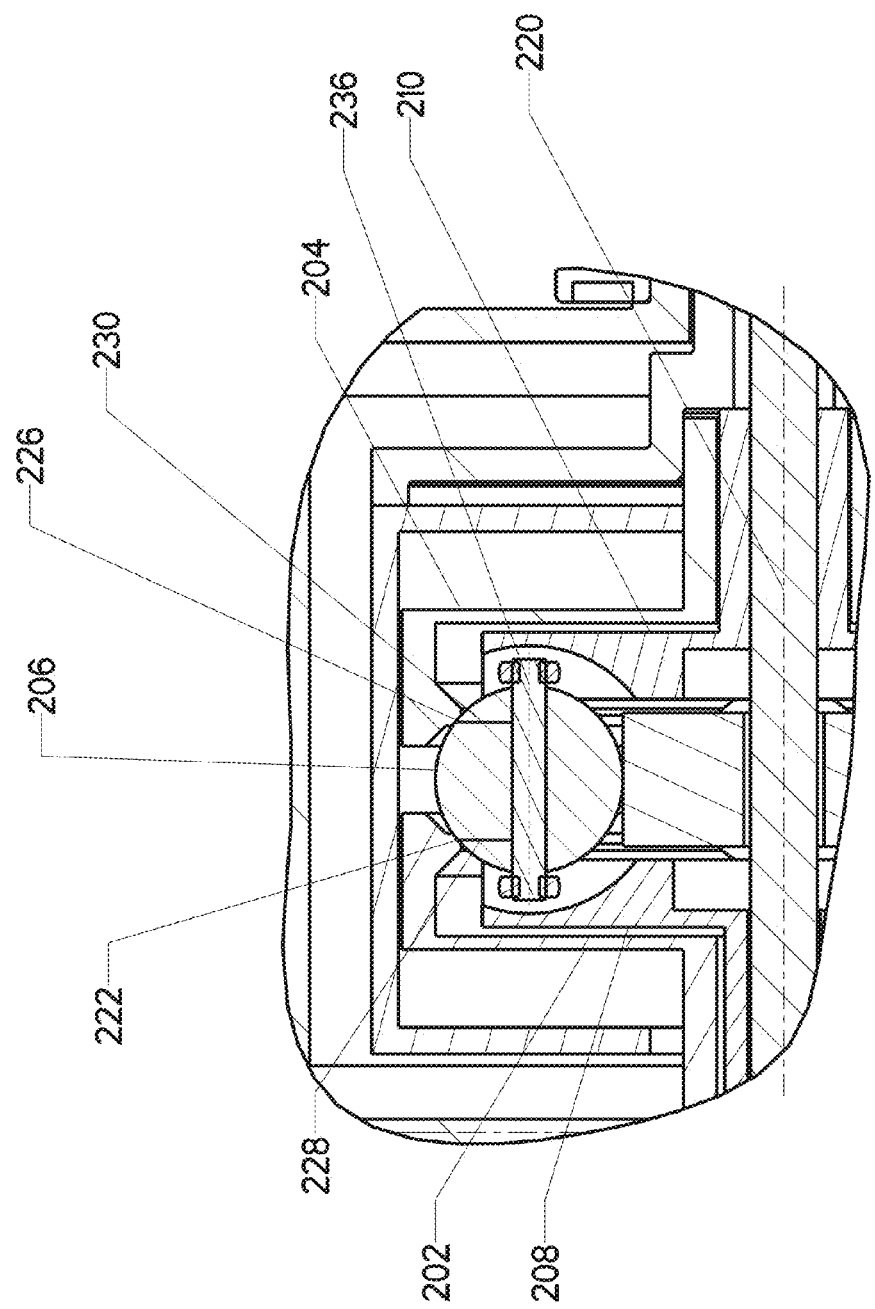
FIG. 2D is a cross-sectional side view of a portion of the input/output planetary ratio assembly of FIG. 2A with an axle axis of the ball planet set to provide a first speed ratio.

As discussed above, CVT 100, CVT 1100 and CVT 2100 can change ratio from the input to the output. The ratio is calculated by dividing a distance 228 from the contact point, 222 to the axis 236 of the axle 214 by the distance 230 from the second contact point 226 to the axis 236 of the axle 214. As shown in FIG. 2D, the device is in a 1:1 ratio with the length of 228 and 230 being equal. Therefore, the first traction ring 202 is going the same RPM as the second traction ring 204. When the second stator 210 rotates relative to the first stator 208, the ball planet 206 and its axle rotates in the X, Y, and Z planes as partially shown in simplified FIG. 2E. When this happens, the distance 232 from the first contact point 222 to the axis 236 of the axle 214 gets longer and the distance 234 from the third contact point 226 to the axis of the axle 214 gets shorter resulting in an under-drive ratio. In this configuration, the second traction ring 204 is going slower than the first traction ring 202. Rotating the second stator 210 in the opposite direction will give you an overdrive with the ball planet 206 and its accompanying parts rotating such that 232 gets shorter and 234 gets longer and the second traction ring 204 will be going faster than the first traction ring, 202.

Figure 3A:
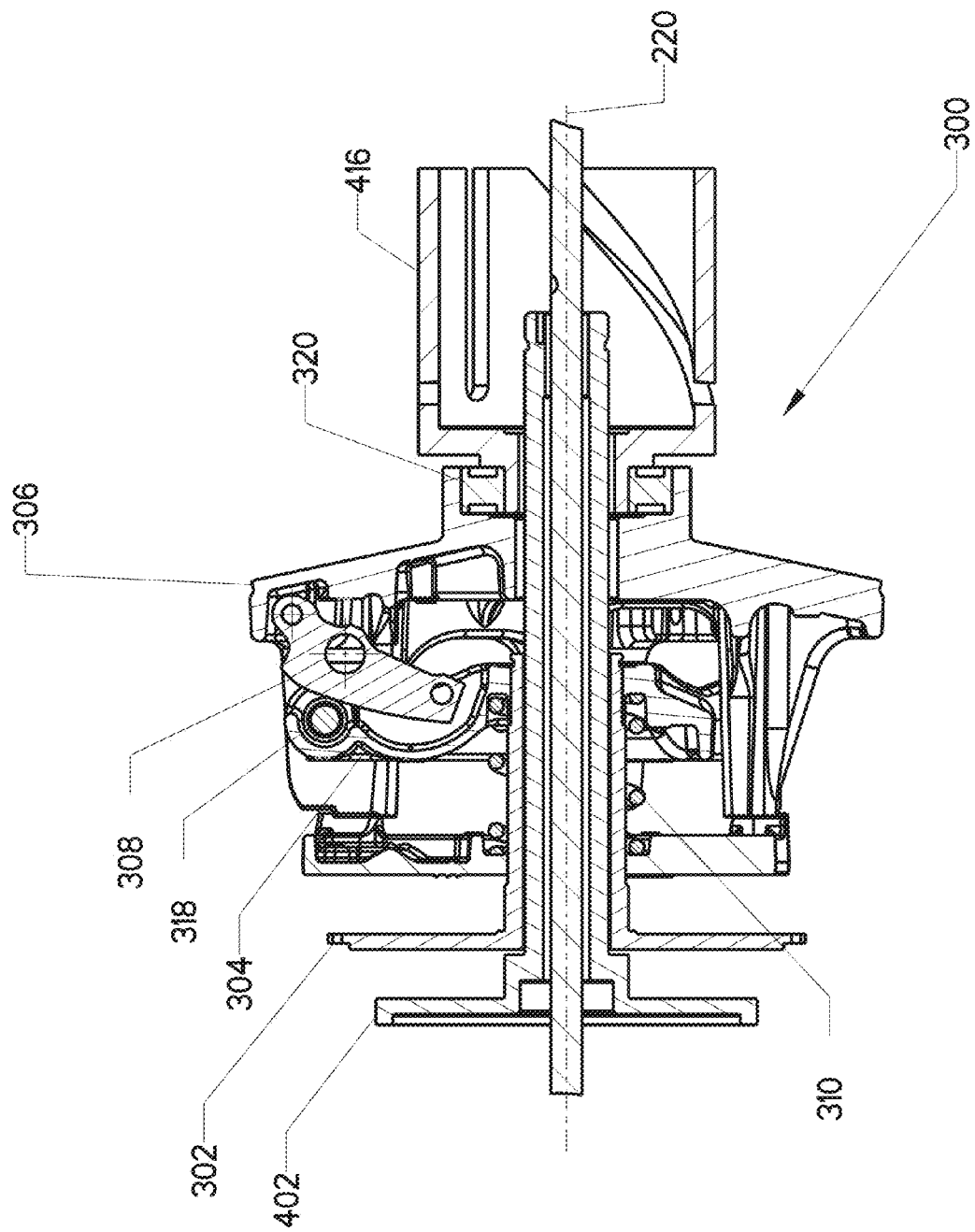
FIG. 3A is a cross-sectional side view of a input speed feedback control assembly of the CVT of FIG. 1.
Figure 3B:
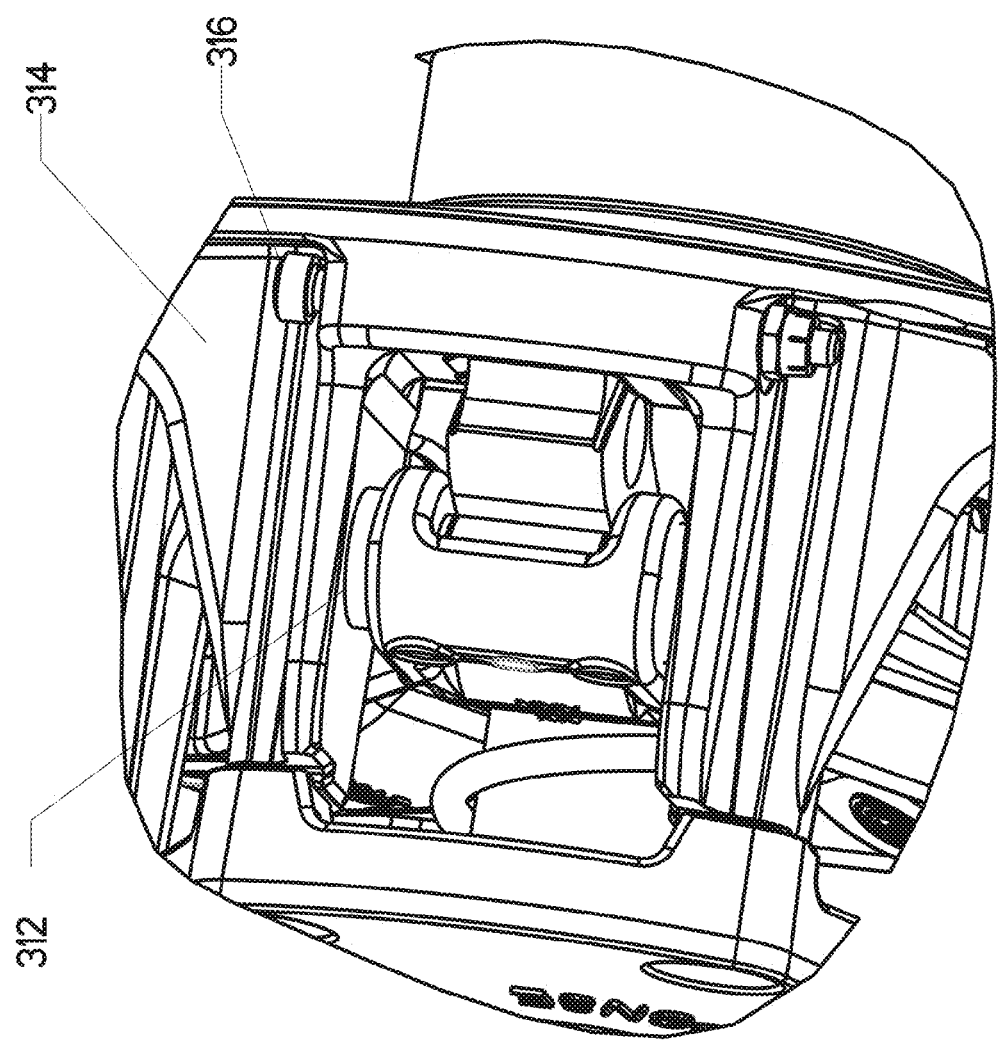
FIG. 3B is a side view of a portion of the input speed feedback control assembly of FIG. 3A.
Figure 3C:
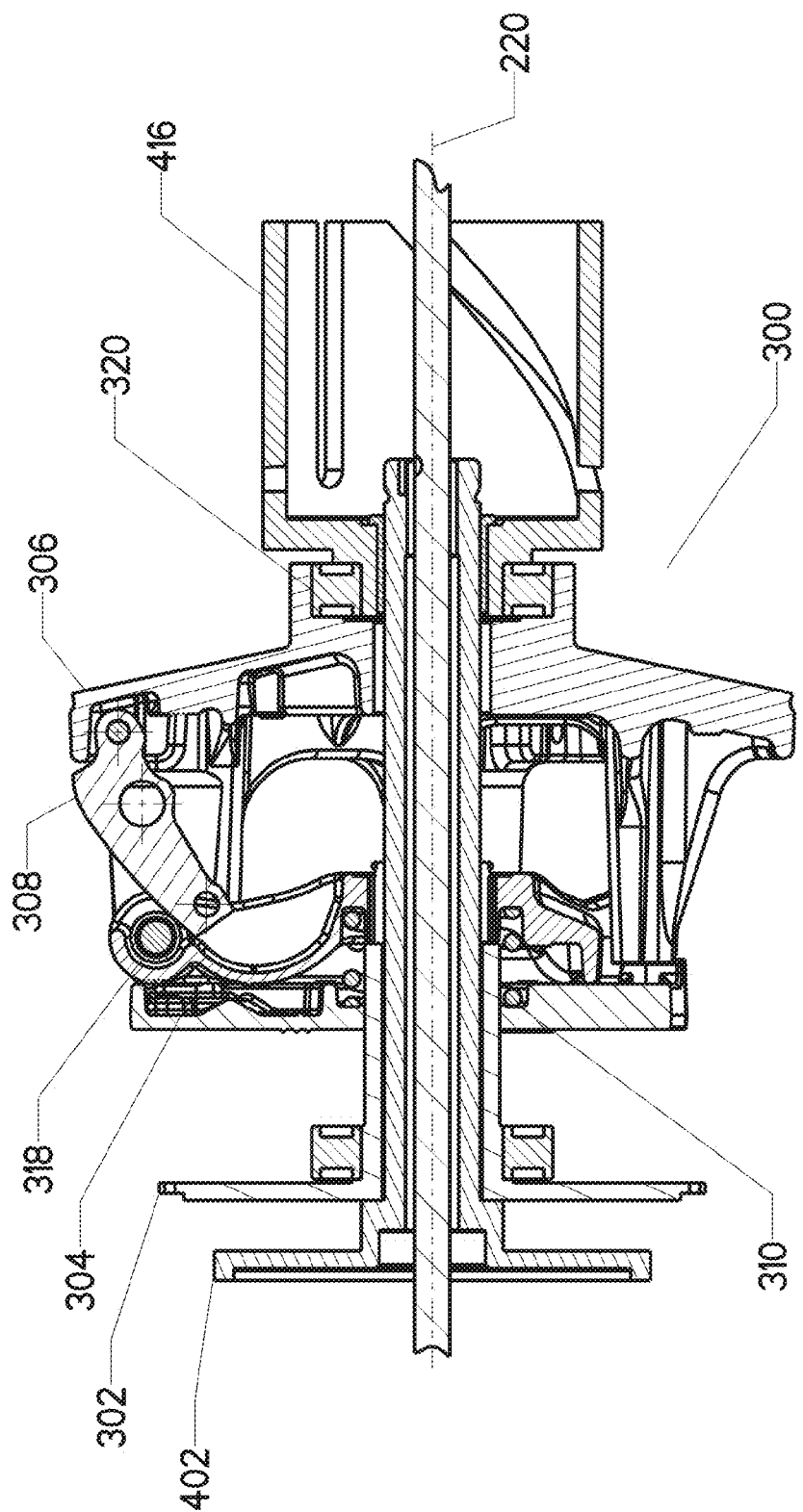
FIG. 3C is a cross-sectional side view of a portion of the input speed feedback control assembly of FIG. 3A positioned to provide a second high speed shift position.
Figure 11A:
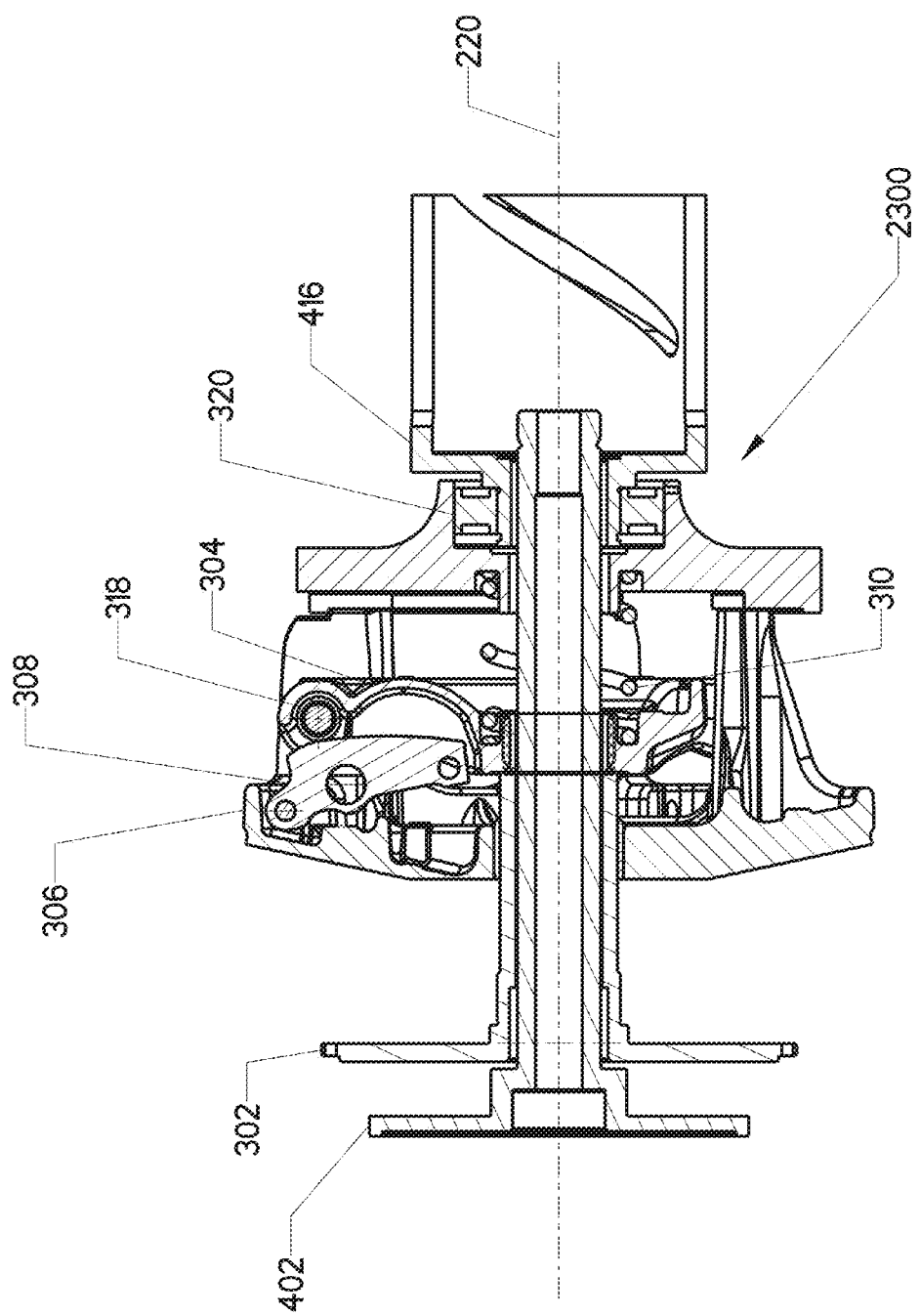
FIG. 11A is a cross-sectional side view of a portion of the input speed feedback control assembly of FIG. 10.
Figure 11B:
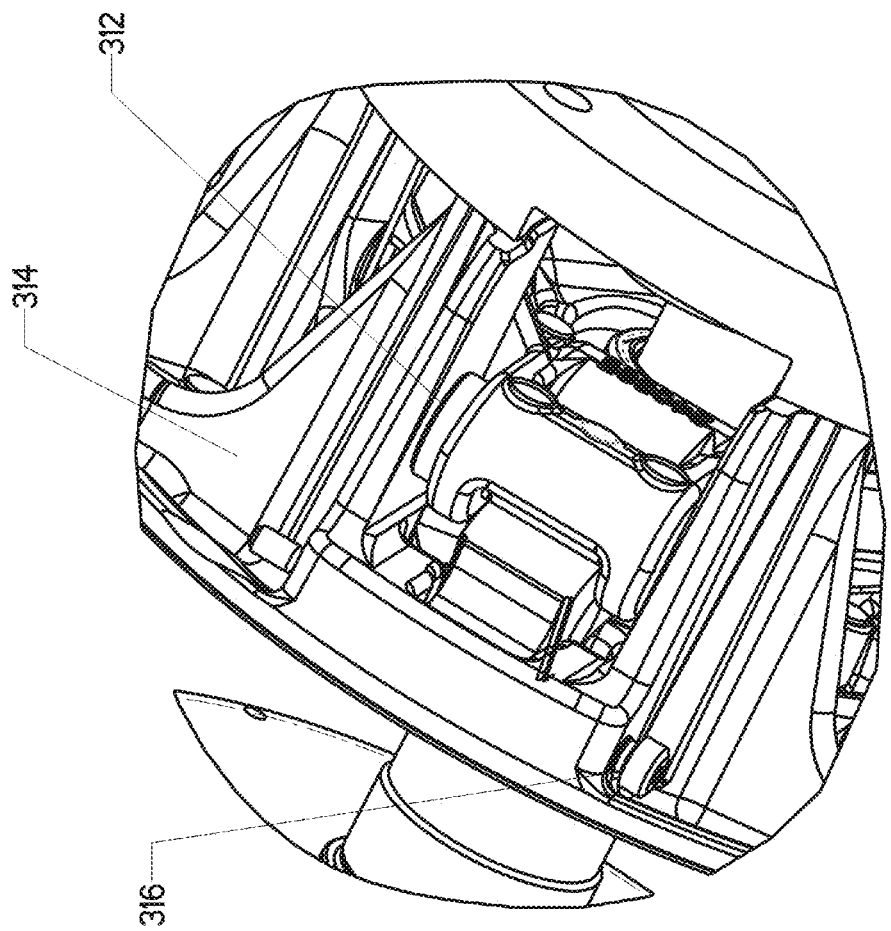
FIG. 11B is a perspective view of a portion of the input speed feedback control assembly of FIG. 11A.
Figure 11C:
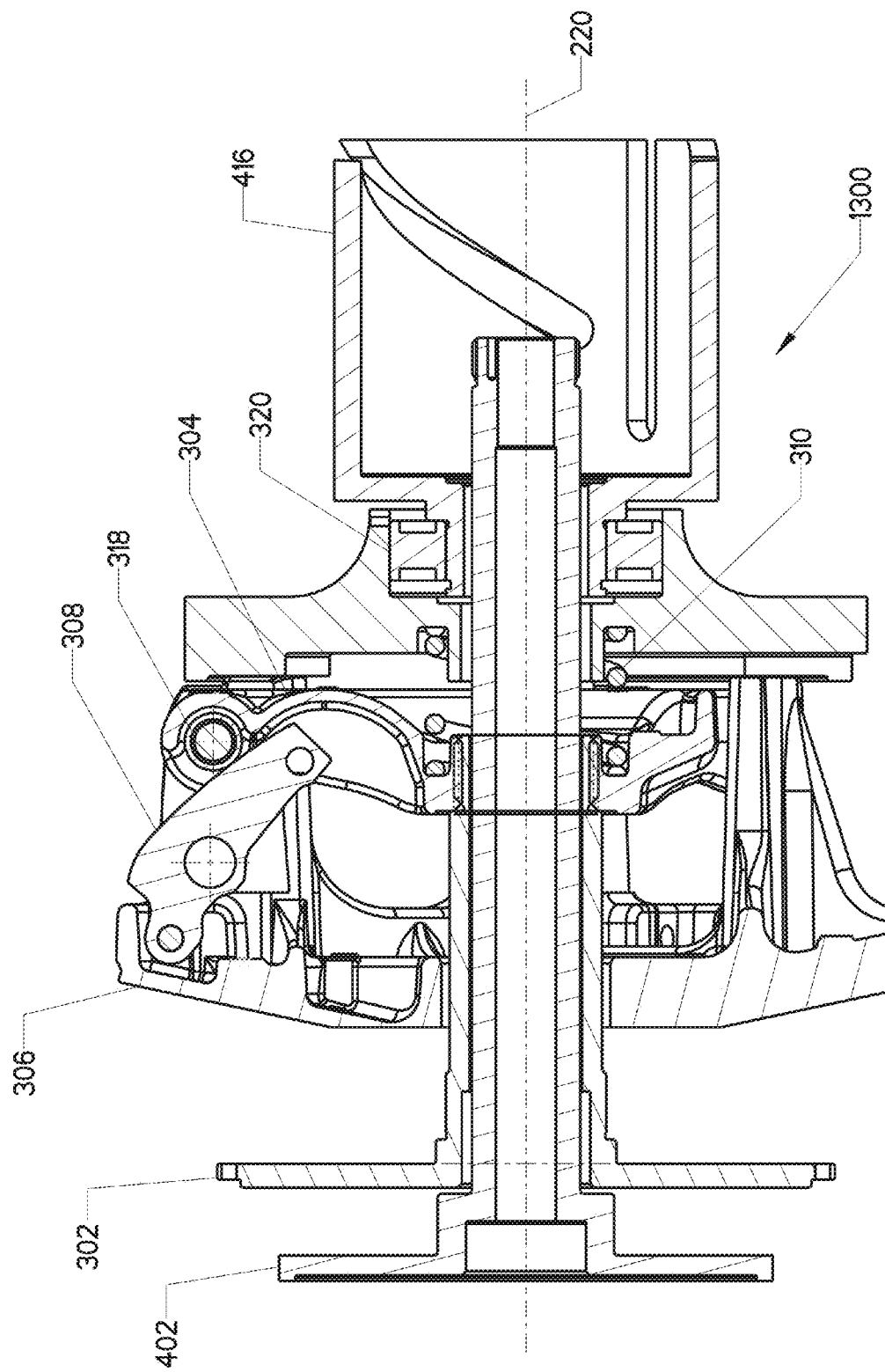
FIG. 11C is a cross-sectional side view of the input speed feedback control assembly of FIG. 11A positioned to provide a second/high speed shift position.

A mechanism that controls the rotation between the first and second stators 208 and 210 is described below. Input speed feedback control assembly 300 related to CVT 100 and input speed feedback control assembly 2300 related to CVT 2100 are similar and are herein described together. FIG. 3A illustrates input speed feedback control assembly 300 and FIG. 11A illustrates input speed feedback control assembly 2300. Shaft 302 is an input shaft to this assembly 300. Shaft 302 can be operatively connected directly to an engine crankshaft, or be operatively connected to the engine through a starter clutch, torque convertor, torque dampener, gear set and the like. Shaft 302 delivers rotational motion to the input speed feedback control assembly 300. Spider 304 is operatively attached to input shaft 302. Spider 304 includes pucks 312 (illustrated in FIGS. 3B and 11B) that contact a tower 314 on a moveable member 306. A shift weight 308 is pivotally attached to the moveable assembly by pin 316. Pin 316 could be any fastener such as a pin or bolt. As the moveable member 306 of the input speed feedback control assembly 300 spins, the shift weight 308 spins about axis 220 of the input/output ratio assembly 200. The faster the moveable member 306 spins, the more centrifugal force is asserted on the shift weight 308. The shift weight 308 is designed such that its center of gravity is above the pivot point, pin 316, so it imparts a force onto the roller 318 which is operatively connected to spider 304. The mechanics of the shift weight 308 to roller 318 creates an axial force in the X direction (The X direction is shown at least in FIGS. 1, 6 and 10). The faster the input speed feedback control assembly portion 300 spins, the more axial force created by the shift weight 308. A plurality of shift weights, arranged about the axis 220, may also be utilized to the same effect. The input speed feedback control assembly 300 further includes a spring 310. The spring 310 is preloaded to a predetermined force. Its purpose is to bias the input speed feedback control assembly 300 and the input speed feedback control assembly 2300 respectfully in "low ratio" which is shown in FIGS. 3A and 11A. Additionally, a spring, pre-loaded to a pre-determined force, may be placed anywhere in the system with the purpose of biasing the input/output planetary ratio assembly 200 towards "low ratio". As the respective input speed feedback control assembly 300 or 2300 spins faster, the shift weight 308 creates more axial force. Once this axial force gets higher than the spring force, the moveable member 306 starts to move on an input/output ratio output shaft 402 towards the cam 416 of the torque feedback control assembly 400 or 2400 and will shift the input/output ratio assembly 200 of the CVT into a higher ratio. This shifting is further described below. FIGS. 3C and 11C depict the input speed feedback control assembly 300 and 2300 respectively in "high ratio". The input to output torque path for these embodiments goes through the input/output ratio assembly 200 and into the torque feedback control assembly 400 or 2400 and does not go through the input speed feedback control assembly 300 or 2300. The rotational motion is used to shift the input/output planetary ratio assembly 200. The axial force created by the input speed feedback control assembly 300 or 2300 gets transmitted to the torque feedback control assembly 400 or 2400 through bearing 320.

A mechanism that controls the rotation between the first and second stators 208 and 210 relating to CVT 1100 is herein described. CVT 1100 embodiment also includes an input speed feedback control assembly generally designated as 700. The input speed feedback assembly 700 is shown in FIG.

Figure 7A:
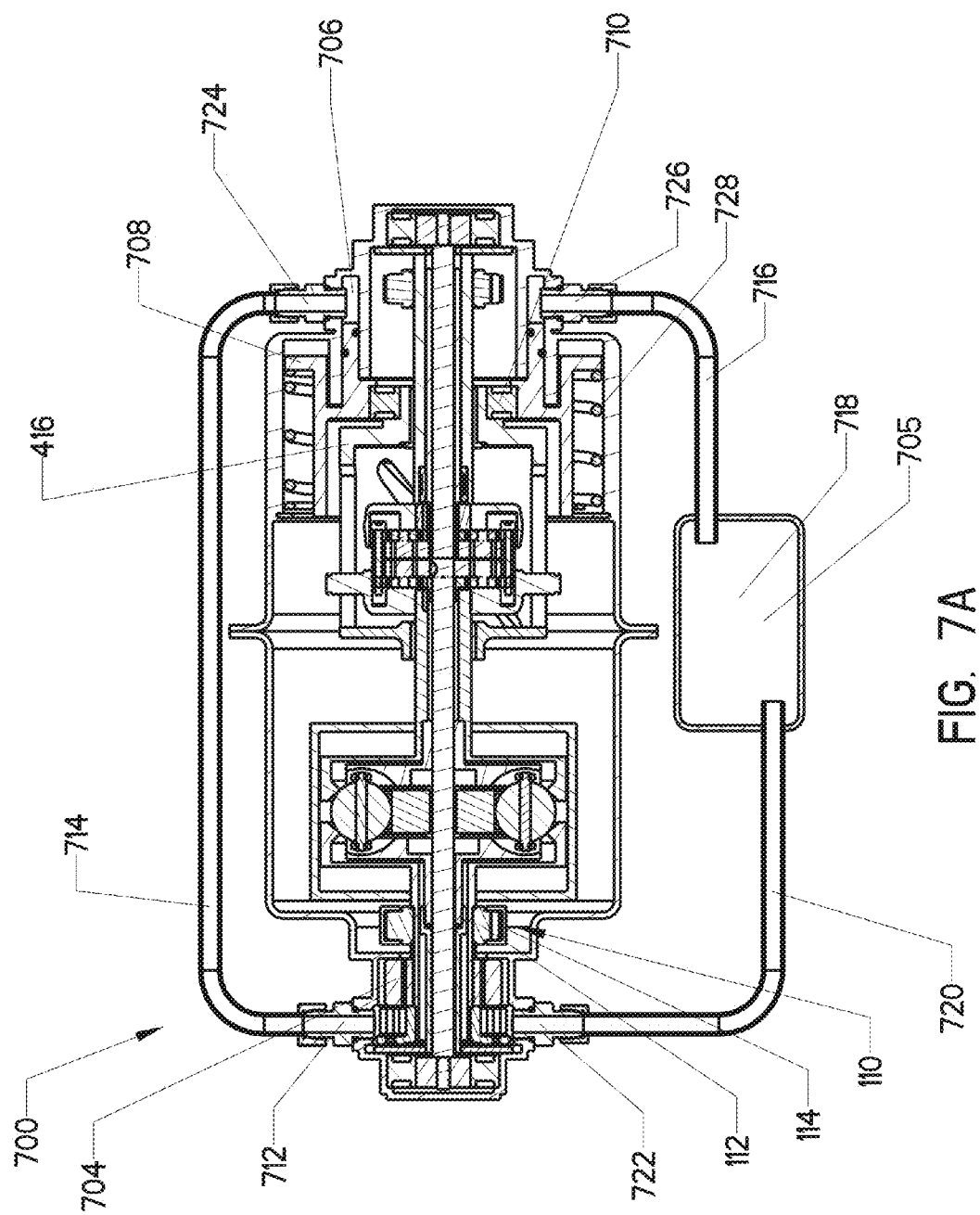
FIG. 7A is a cross-sectional side view of the input speed feedback control assembly of FIG. 6.
Figure 7B:
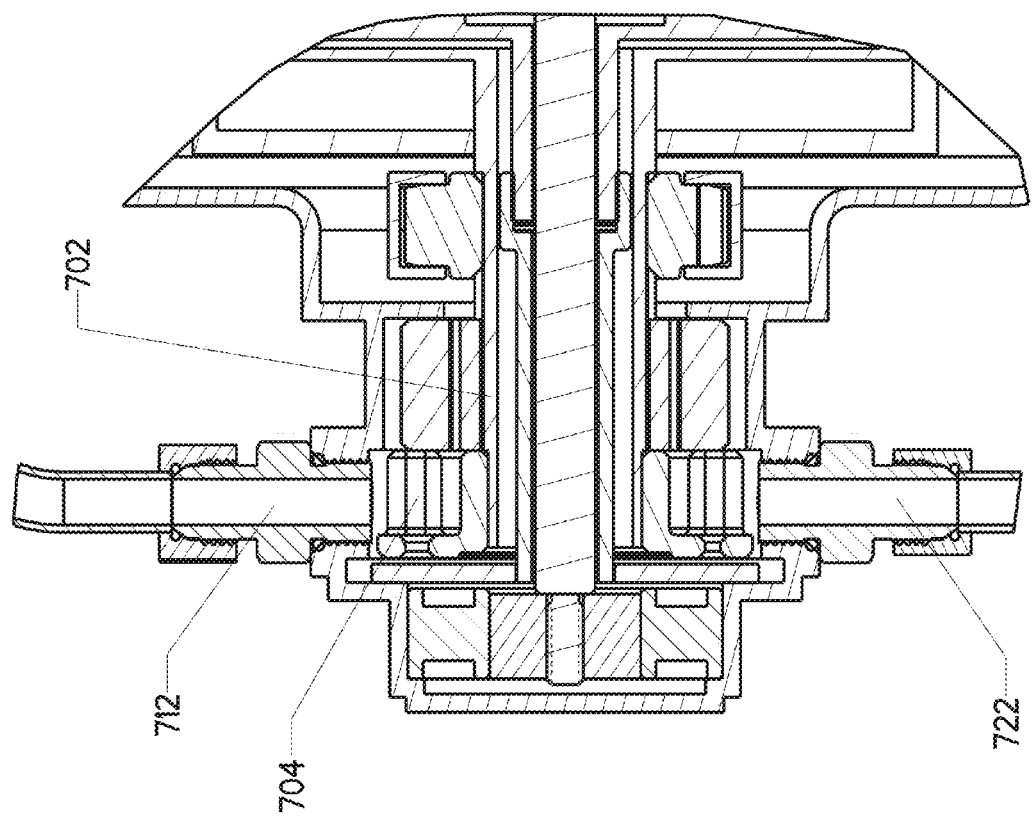
FIG. 7B is a cross-sectional side view of a portion of the input speed feedback control assembly of FIG. 7A.
Figure 7C:
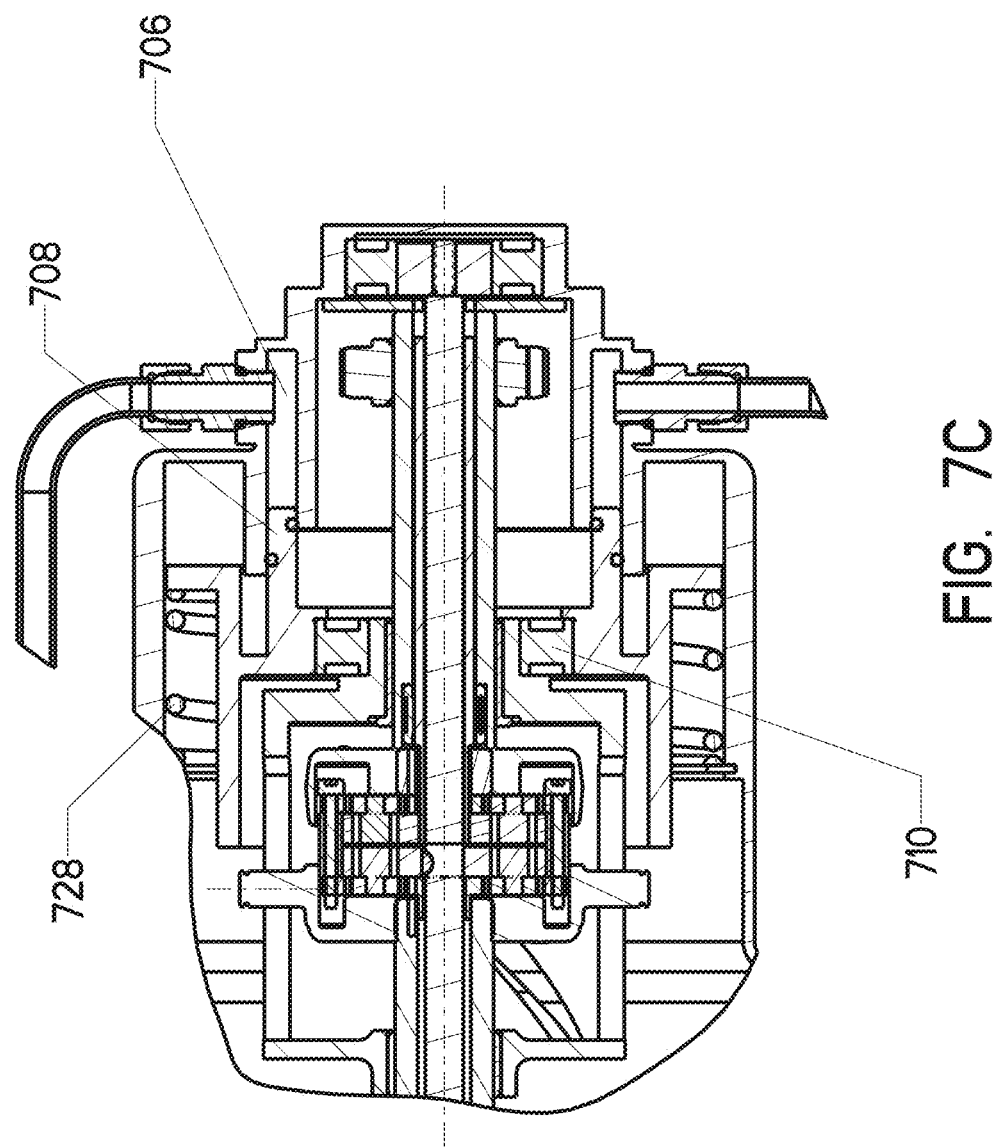
FIG. 7C is a cross-sectional side view of a portion of the input speed feedback control assembly of FIG. 7A positioned to provide a second high speed shift position.

6 as having a first portion 700A and a second portion 700B. In FIG. 7A elements of the input speed feedback control assembly 700 are indicated and in FIG. 7B is a cross-sectional side view of a first portion 700A of the input speed feedback control assembly 700 is provided. The input assembly 110, which in this embodiment is shown with a sprocket 112 along with a belt 114 is an input member to assembly 700. Input assembly 110 can be operatively connected directly to an engine crankshaft, or be operatively connected to the engine through a starter clutch, torque converter, torque dampener, gear set, sprocket and chain, sprocket and belt and the like. Input assembly 110 delivers rotational motion to a shaft 702 of the input speed feedback control assembly 700. Shaft 702 is operatively connected to a hydraulic pump 704 of the input speed feedback control assembly 700. The input speed feedback control assembly 700 includes a chamber 706 that is in part defined by a moveably member which is a piston 708 in this embodiment, which may be annular or a set of one or more of cylindrical geometry. The shape is not essential to the operation but merely for packaging or manufacturing considerations. Additionally, the piston 708 or pistons may be operatively connected to bearing 710 directly as shown or through a mechanism such as a pivot fork or other similar mechanical transformer. Hydraulic oil 705 is pumped through passages from the hydraulic pump outlet 712 to the chamber 706 through a passage 714 and an inlet 724. Hydraulic oil 705 exits the chamber 706 through exit 726 and a passage 716 and is returned to a sump 718, which supplies the hydraulic oil 705 to the hydraulic pump 704 through a passage 720 and inlet 722. The flow of hydraulic oil 705 may be impeded by fixed or variable means before or after the chamber 706, such as at the chamber 706 inlet 724 and chamber 706 outlet 726. As the input of the hydraulic pump 704 of the input speed feedback control assembly 700 rotates, hydraulic fluid flow is generated and supplied to the chamber 706. The faster the input of the hydraulic pump 704 rotates, the greater the hydraulic flow. As the hydraulic flow is impeded by fixed or variable means before or after the chamber 706, hydraulic pressure in the chamber 706 results, and creates an axial force in the X direction against the piston 708 as shown. This axial force is a function of input assembly member 110 rotational rate. As the pressure in chamber 706 increases, the piston 708 axial force increases in response. The input speed feedback control assembly 700 further includes a spring 728. The spring 728 is pre-loaded to a predetermined force. Its purpose is to bias the input speed feedback control assembly 700 in "low ratio" which is shown in FIG. 7A. Additionally, a spring pre-loaded to a pre-determined force may be placed anywhere in the system with the purpose of biasing the input/output planetary ratio assembly 200 towards "low ratio." As the input speed feedback control assembly 700 member 110 spins faster, the hydraulic pressure of chamber 706 exerts more axial force on the piston 708. Once this axial force gets higher than the spring force, the piston 708 starts to move towards the cam 416 of the torque feedback control assembly 1400. The axial force created by the input speed feedback control assembly 700 gets transmitted to the torque feedback control assembly 400 through bearing 710. FIG. 7C depicts the input speed feedback control assembly 700 in a "high ratio." In addition, the hydraulic oil 705 can be a wide variety of oils that are in common use specifically for current commercial hydraulic systems including those formulated primarily for lubrication, traction, and cooling.

In an additional embodiment, shift-weights that travel radially between the spider and the movable member produce a centrifugal radial force as a function of input rotational speed that is transformed into an axial force as a result of the angles of contact between the shift-weights and the spider and movable member. In yet another embodiment, a generator output such as a magneto, electrically operatively connected to an electromagnetic actuator such as a DC motor or solenoid exerts an axial force in opposing direction to the torque feedback control assembly. In yet another embodiment an electronic proximity sensor such as a hall-effect, reed, variable reluctance sensor can be interfaced with a microprocessor to detect and calculate input shaft rotational rate and deliver an electrical power signal to an electrically controlled actuator. This electrical power signal may be a linear or non-linear function of input shaft rotational rate. The algorithm may also be a function of atmospheric barometric pressure in order to compensate for engine power output changes that occur as a result of altitude changes. An electrically controlled actuator may apply an axial force directly or indirectly to the torque feedback control assembly or may control a valve in a hydraulic circuit that regulates the hydraulic pressure and thus control the axial force. An electrically controlled actuator may apply piston hydraulic pressure that is in communication with a piston that may exert an axial force in opposing direction to the torque feedback control assembly.

Figure 4A:
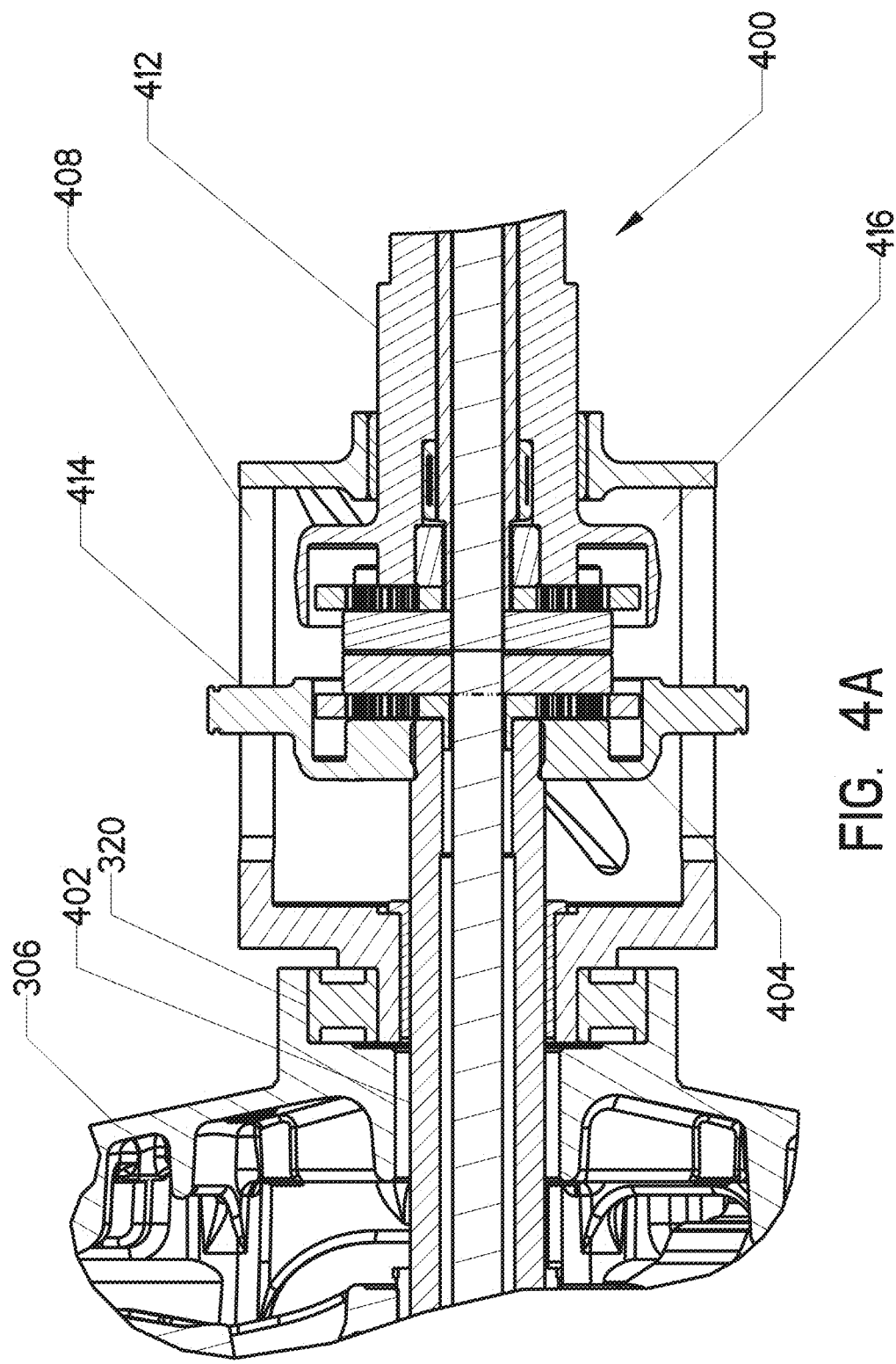
FIG. 4A is a cross-sectional side view of the torque feedback control assembly of the CVT of FIG. 1.
Figure 4B:
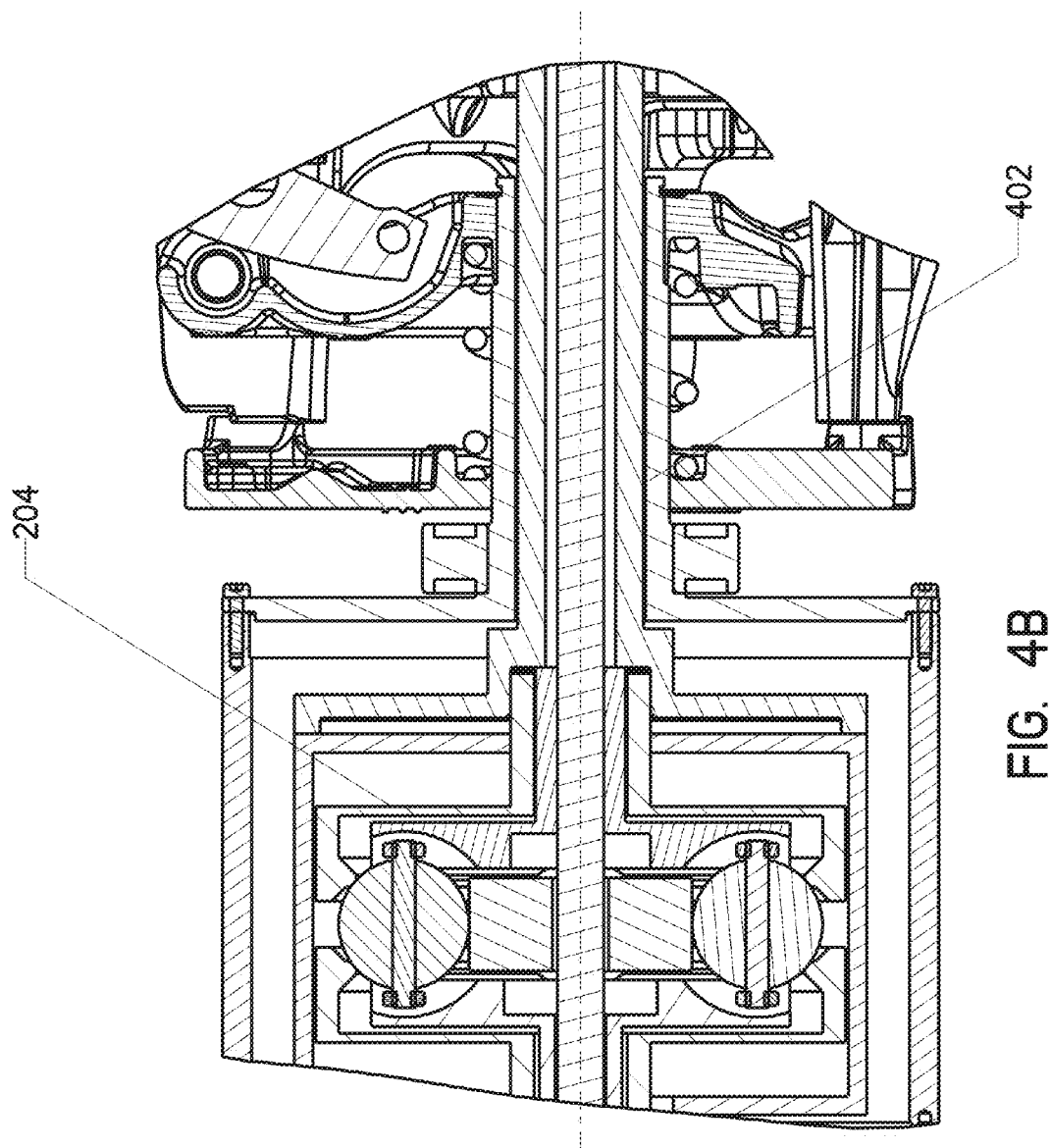
FIG. 4B is a cross-sectional side view of a portion of the torque feedback control assembly of FIG. 4A.
Figure 4C:
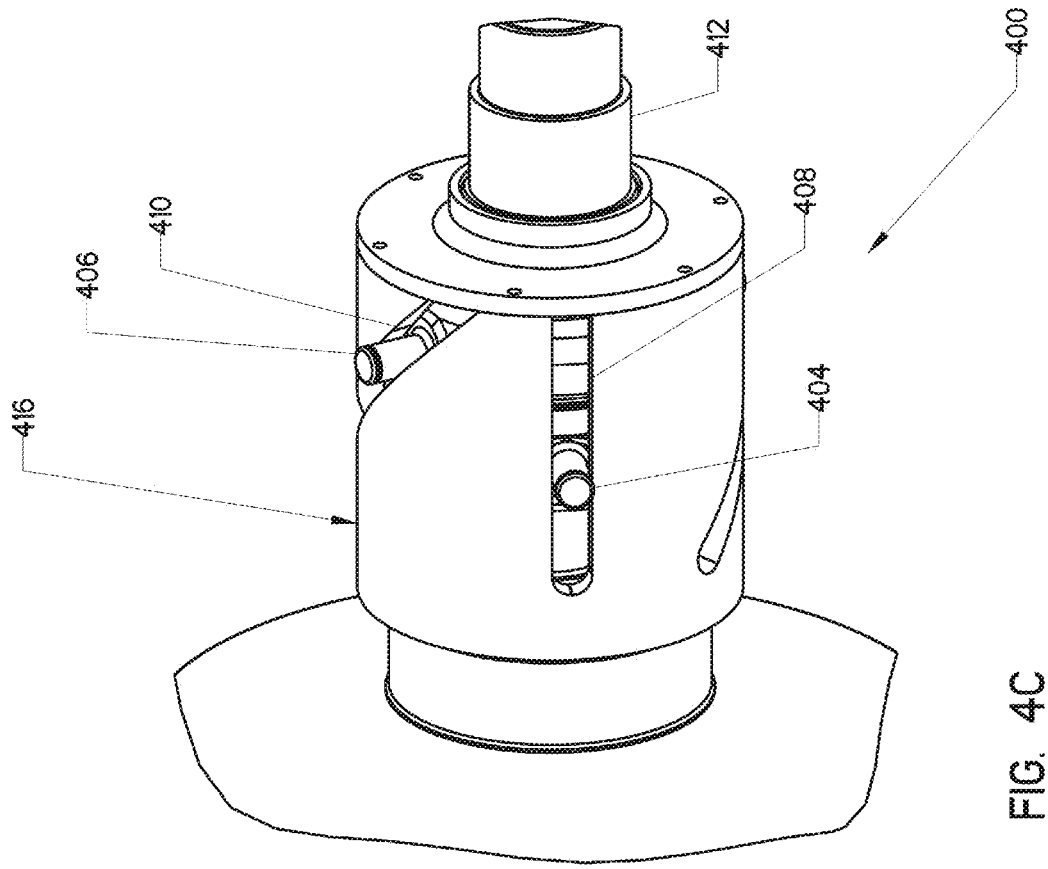
FIG. 4C is a perspective view of the torque feedback control assembly of FIG. 4A.
Figure 8A:
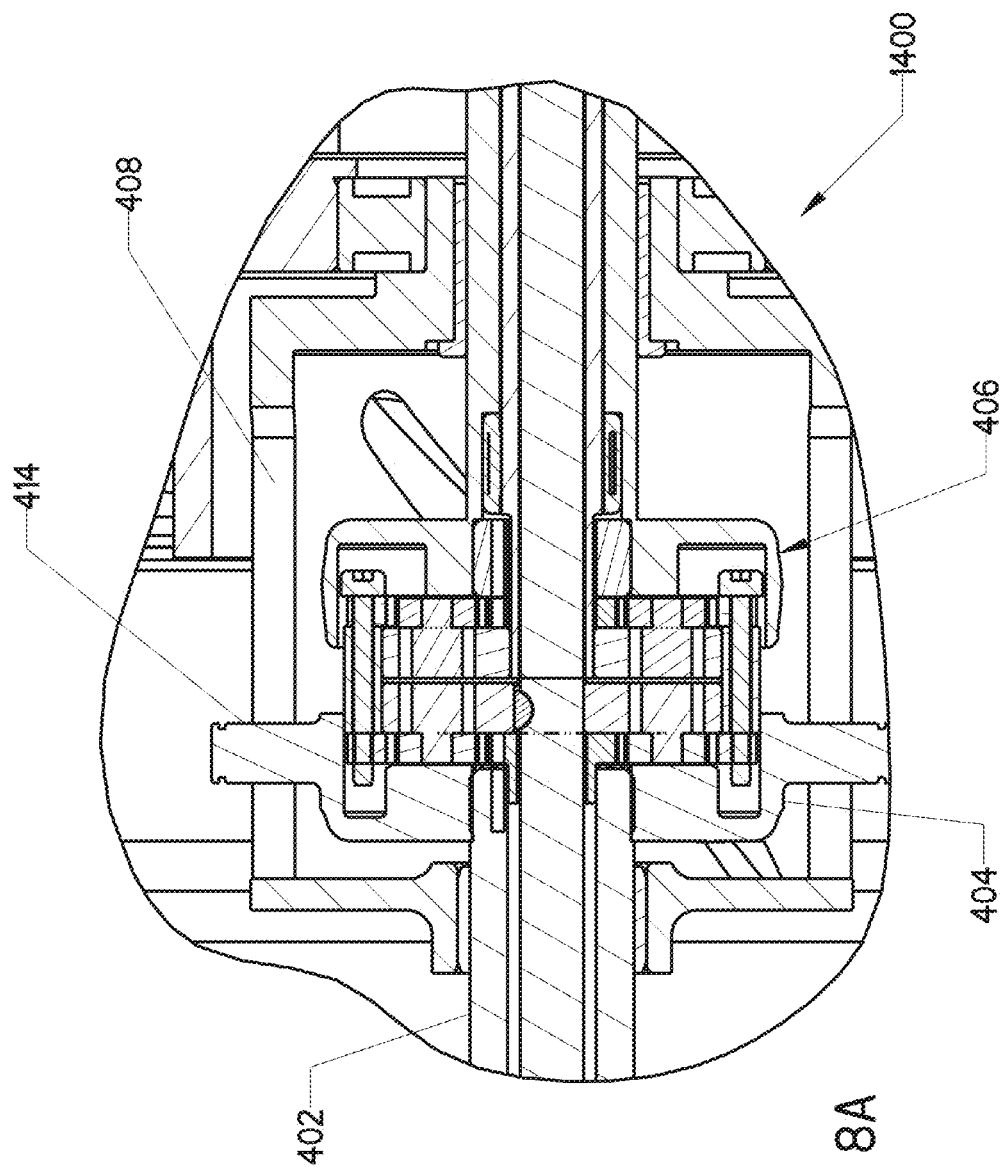
FIG. 8A is a cross-sectional side view of the torque feedback control assembly of the CVT of FIG. 6.
Figure 8B:
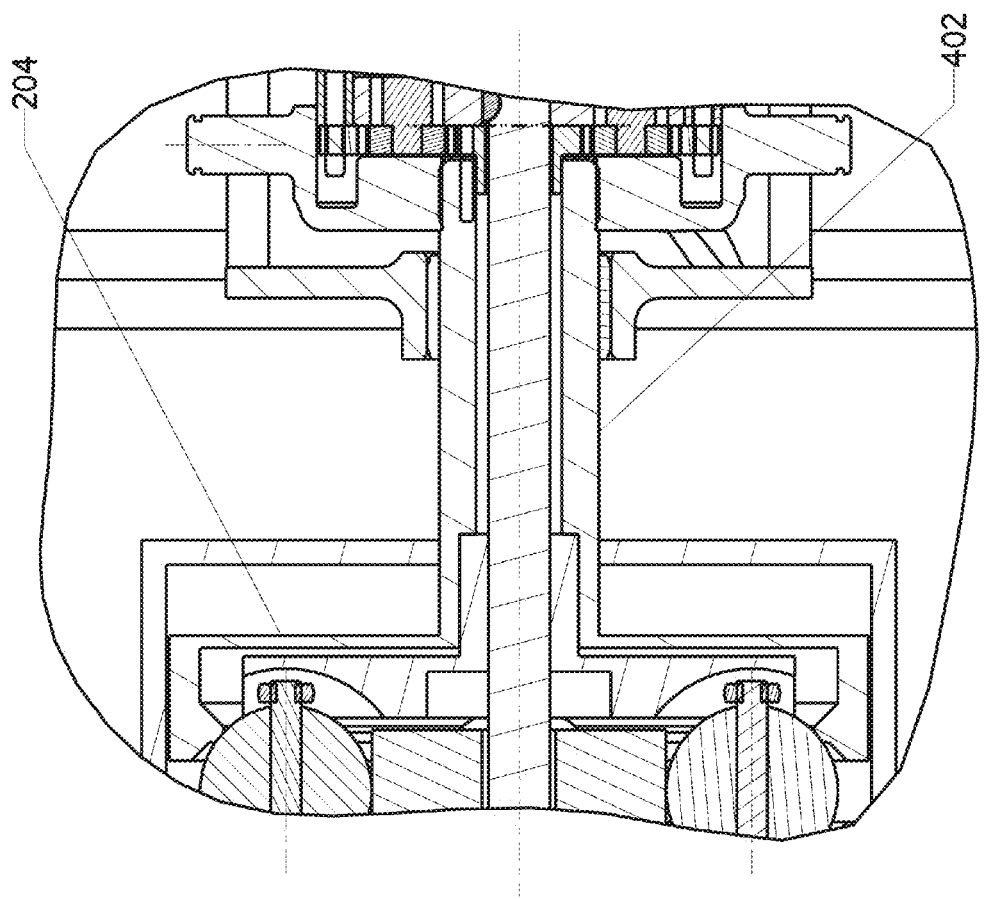
FIG. 8B is a cross-sectional side view of a portion of the torque feedback control assembly of FIG. 8A.
Figure 8C:
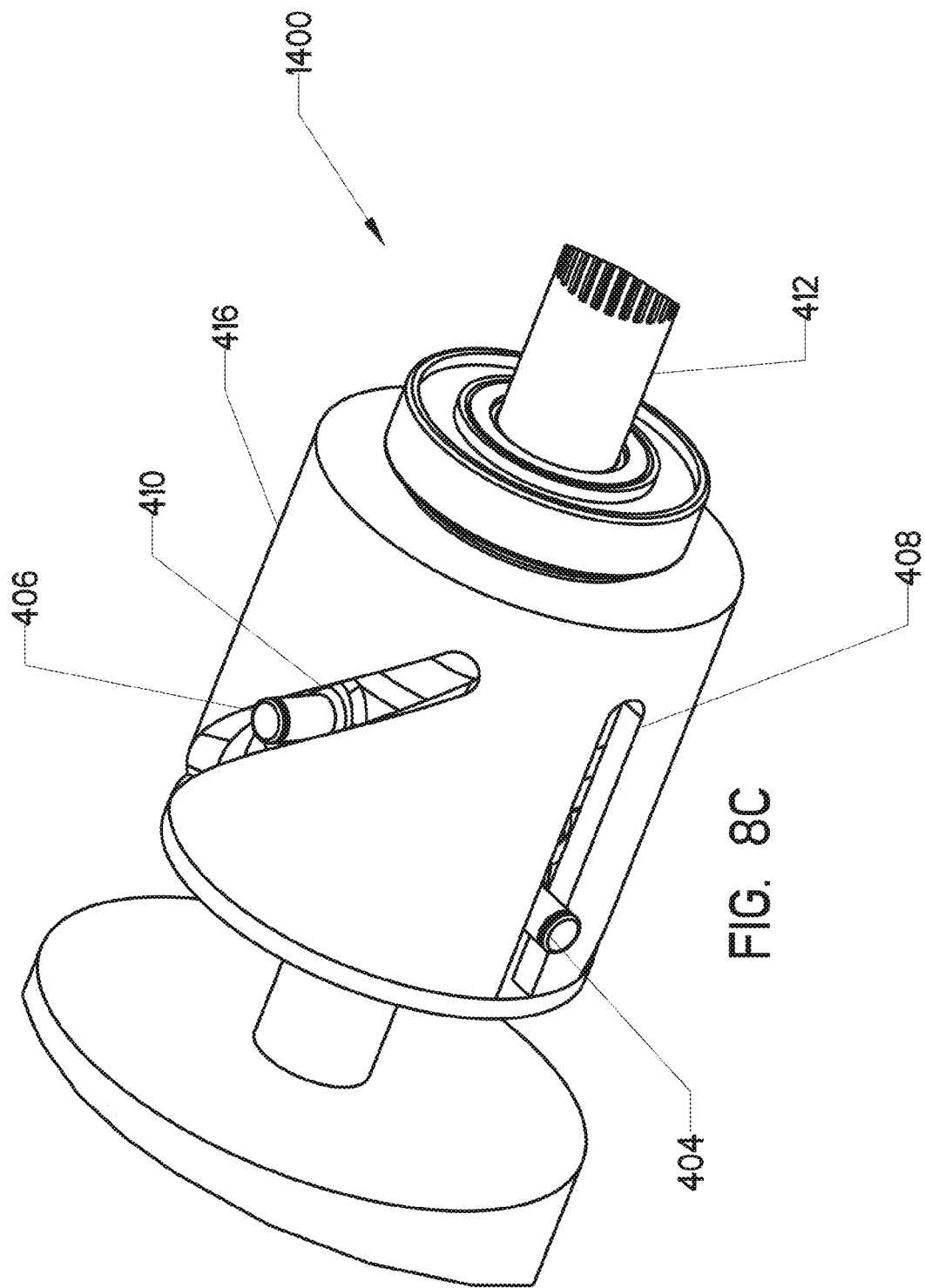
FIG. 8C is a perspective view of the torque feedback control assembly of the CVT of FIG. 6.
Figure 12A:
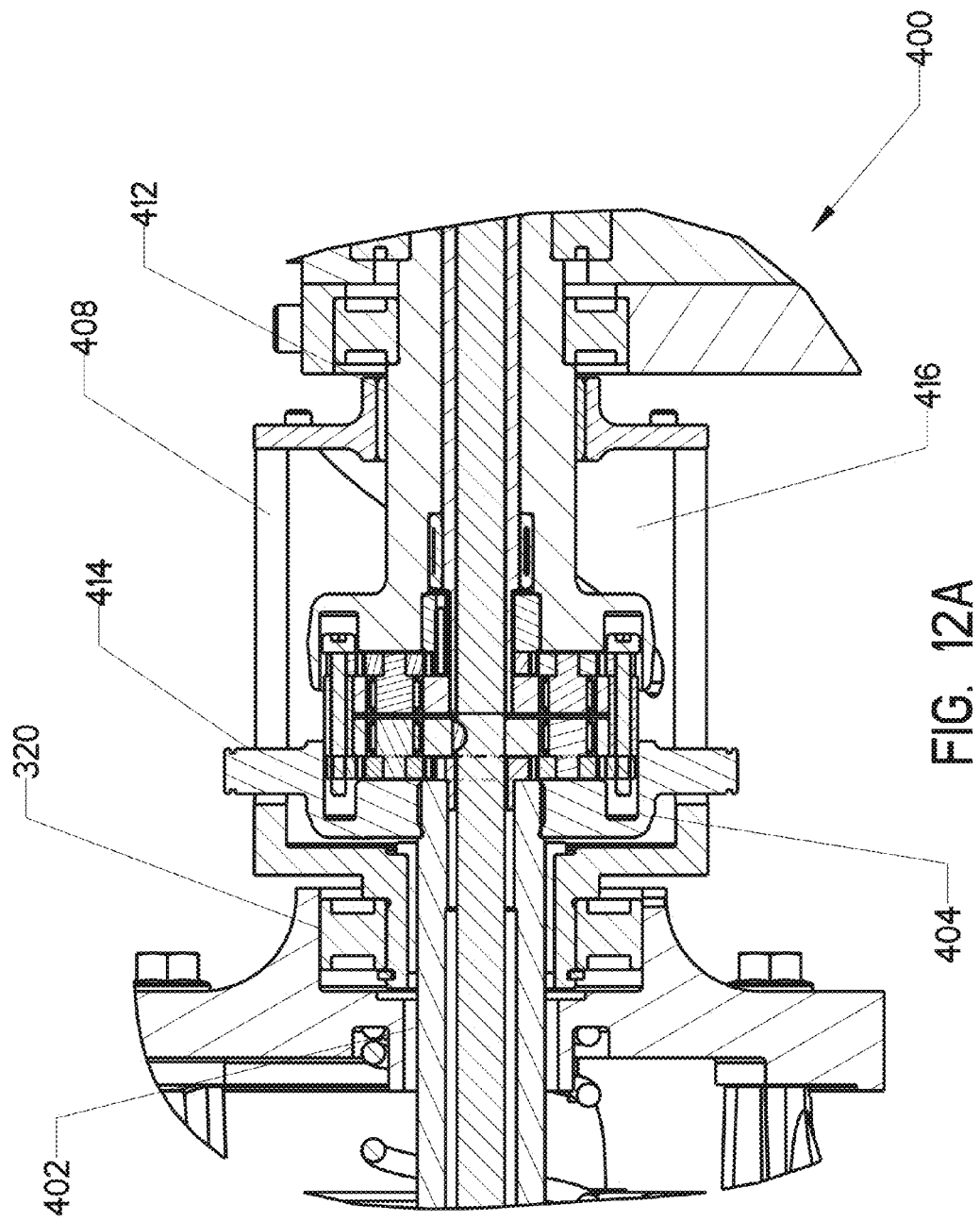
FIG. 12A is a cross-sectional perspective view of the torque feedback control assembly of the CVT of FIG. 11A.
Figure 12B:
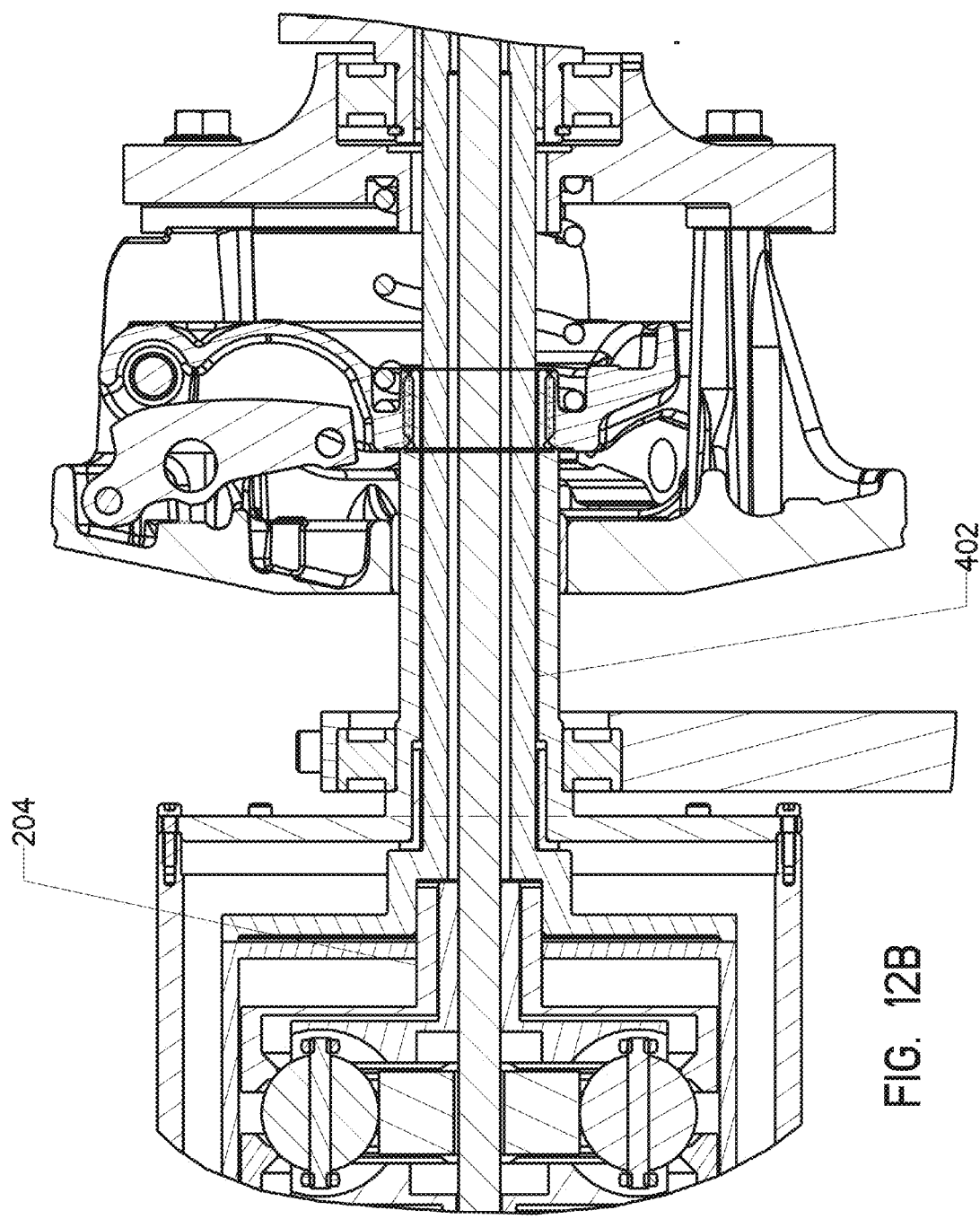
FIG. 12B is a cross-sectional side view of a portion of the torque feedback control assembly of FIG. 12A.
Figure 12C:
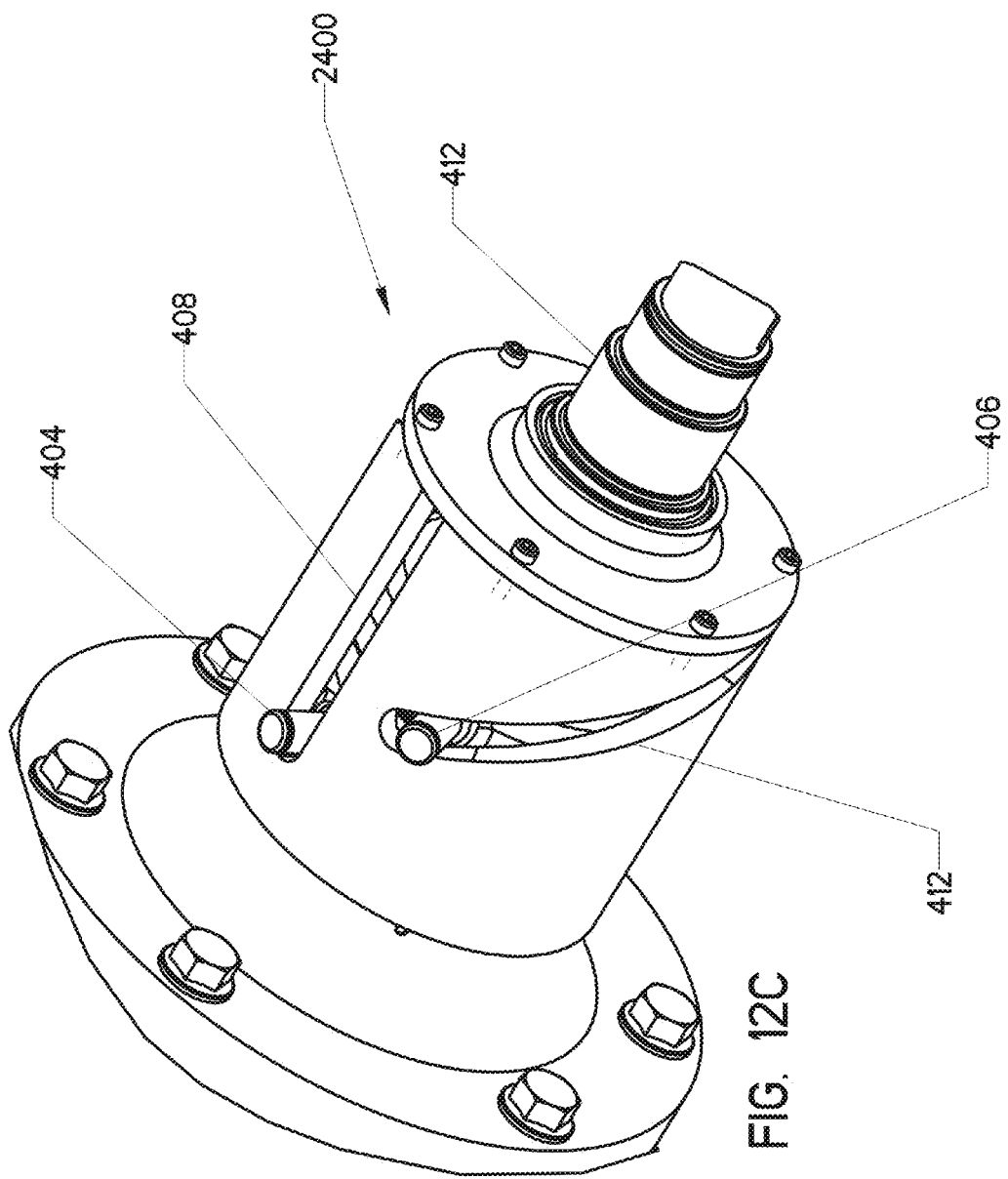
FIG. 12C is a perspective view of the torque feedback control assembly of the CVT of FIG. 10.

The input/output ratio shaft 402 is the output shaft from the input/output planetary ratio assembly 200 of CVT 100, 1100 and 2100. Shaft 402 is operatively connected to a second traction ring 204 as best illustrated in FIGS. 4B, 8B and 12B. Shaft 402 transmits torque and rotational motion. As illustrated in FIGS. 4A, 8A and 12A of the respective embodiments, shaft 402 goes into the torque feedback control assembly 400, 1400 or 2400. The purpose of the torque feedback control assembly 400 or 2400 is to transmit torque and using this vehicle torque, create a proportional axial, X, force back to the input speed feedback control assembly 300, 700 and 2300 of CVT 100, 1100 and 2100 respectively. The cam's axial location dictates the phase relationship between two cam spiders 404 and 406, as illustrated in FIGS. 4C, 8C and 12C, which controls the shifting mechanism inside the input/output planetary ratio assembly 200. The torque comes into the torque feedback control assembly 400, 1400 or 2400 from shaft 402. This shaft 402 is operatively connected to the cam 416 through the first spider 404. This first spider 404 transmits torque to a straight (or generally straight) track 408 as best illustrated in FIGS. 4C, 8C and 12C. The torque and rotational motion are then in the cam 416 of the torque feedback control assembly 400, 1400 or 2400. This torque and rotational motion then go to helix track 410 and to a second spider 406. Because track 408 is straight in the cam 416, there is little to no axial force. Because of the helical nature of track 410 in the cam 416, an axial force is created in the contact area with the second spider 406. This axial force opposes the force created by the input speed feedback control assembly 300. Therefore the lower the torque load from the vehicle, the lower the axial force created by the torque feedback control assembly 400, 1400 or 2400 and the higher the torque load from the vehicle, the higher the axial force created by the torque feedback control assembly 400, 1400 or 2400. The torque and rotational motion then goes from the second spider 406 into the CVT output shaft 412. The torque and rotational motion are operatively connected to the load, such as the tires of a vehicle. Forces between the input speed feedback control assembly 300 and torque feedback control assembly 400, 1400 or 2400 balance at a unique axial location for any given combination of input speed and output torque. If there is a relatively high engine speed, the input speed feedback control assembly 300 spins at a relatively high rotational motion creating relatively high axial force. If there is low vehicle torque, the torque feedback control assembly 400, 1400, 2400 has a relatively low axial force and the mechanism wants to shift into a higher ratio meaning the vehicle will go relatively faster.

If you have a relatively high engine speed, you have a relatively high input speed feedback control assembly 300, 700 and 2300 speed and relatively high axial force. For a given input RPM, if the load increases (i.e. more torque is transmitted through the torque feedback control assembly 400, 1400 or 2400) a larger axial force will be created, opposing the input speed feedback control assembly 300, 700 and 2300, the torque feedback control assembly 400, 1400 or 2400 moves until forces balance. With the helical track 410, the second spider 406 rotates relative to the first spider 404 which operates in the straight track 408 causing a phase change between the spiders 404 and 406. This change in axial location of the torque feedback control assembly 400, 1400, 2400 results in a spider phase change that results in a change in CVT ratio as subsequently discussed below in detail. Rollers could be put on the spider pins 414 to reduce friction. The forces from the input speed feedback control assembly 300 and torque feedback control assembly 400, 1400 or 2400 can be reversed so the input speed feedback control assembly 300, 700 and 2300 pulls against the torque feedback control assembly 400, 1400 or 2400 and the torque feedback control assembly 400, 1400 or 2400 pulls back against the input speed feedback control assembly 300, 700 and 2300. The two sets of spiders 404 and 406 and associated tracks 408 and 410 create the phase change required as input into the differentials that shifts the CVT which is further explained below. The first and second spider functions are interchanged in another embodiment. In this embodiment, the first spider 404 runs in the helix track 410 and the second spider 406 runs in the straight track 408. Moreover, other ways of accomplishing the functions of the cam and spider functions are contemplated such as having a cut track in a shaft with a cam follower connected to the cam. Another example is with the use of a straight spline on the shaft with a mating spline on the cam itself. In this embodiment only one helical track on the cam is required.

The preferred embodiment has been shown and described above. An additional embodiment interchanges the straight 408 and helical 410 tracks. Additionally the two tracks may both be helical with different angles where the difference in the angles will provide the phase change between the two spiders 404 and 406. Moreover, additional embodiments include using splines, screw threads, face cams, ball-ramp cams or tracks cut into the operative shafts along with cam followers, mating splines, mating threads to realize the function of the spiders and straight and helical tracks previously described.

Figure 5A:
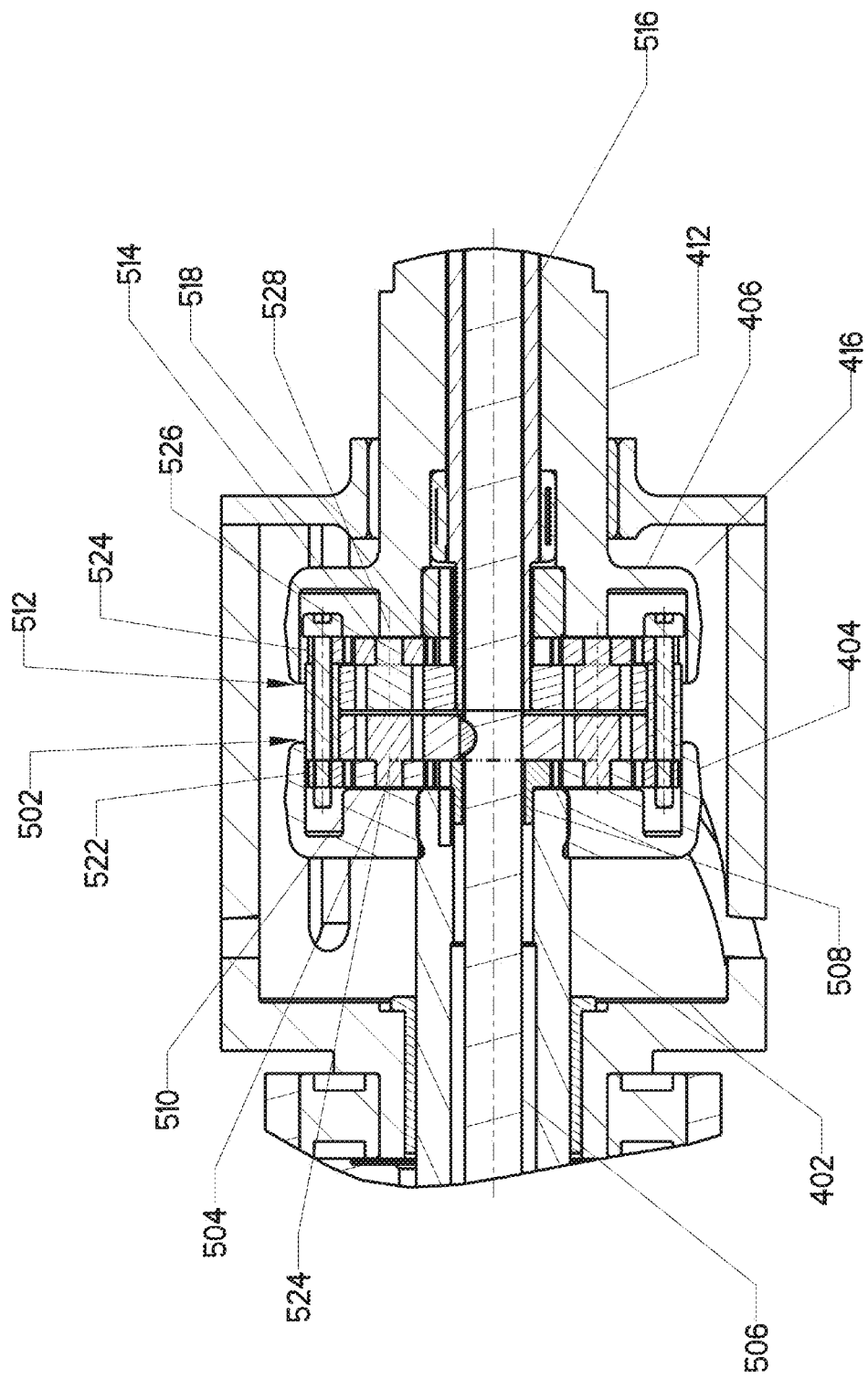
FIG. 5A is a cross-sectional side view of the differential assembly of the CVT of FIG. 1.
Figure 5B:
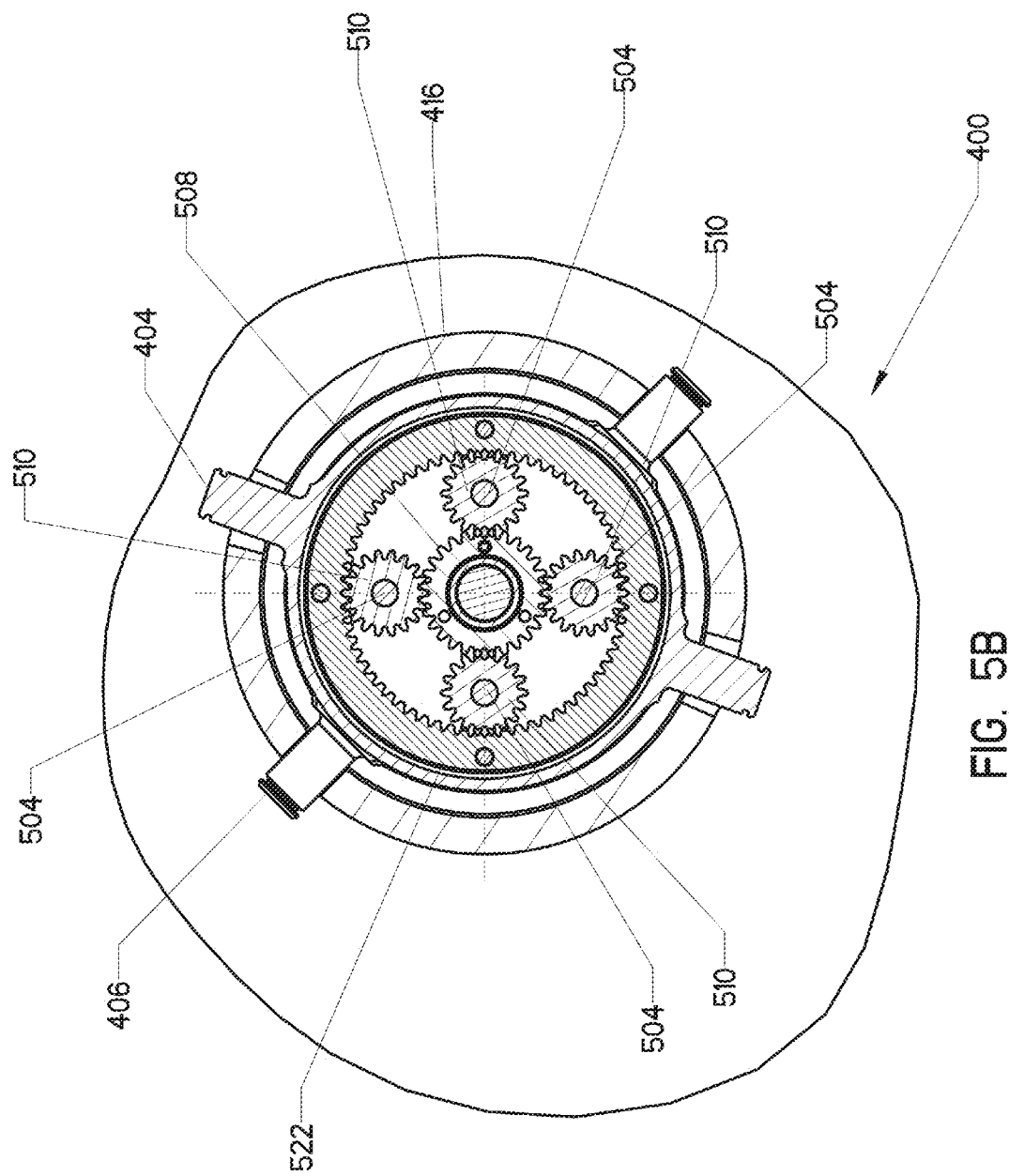
FIG. 5B is a cross-sectional front view of a portion of the torque feedback control assembly of FIG. 4A.
Figure 9B:
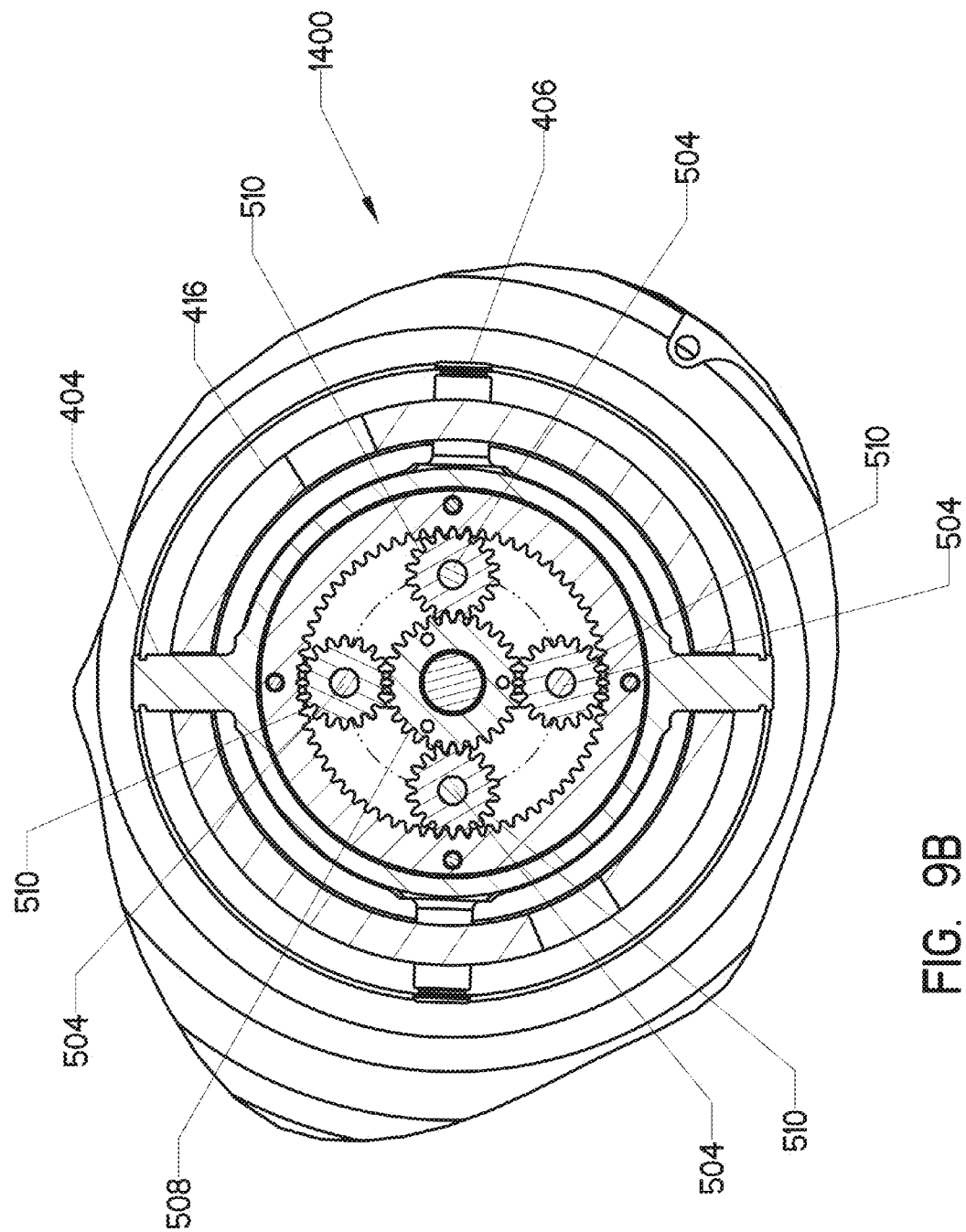
FIG. 9B is a cross-sectional front view of the differential assembly of the CVT of FIG. 6.
Figure 13A:
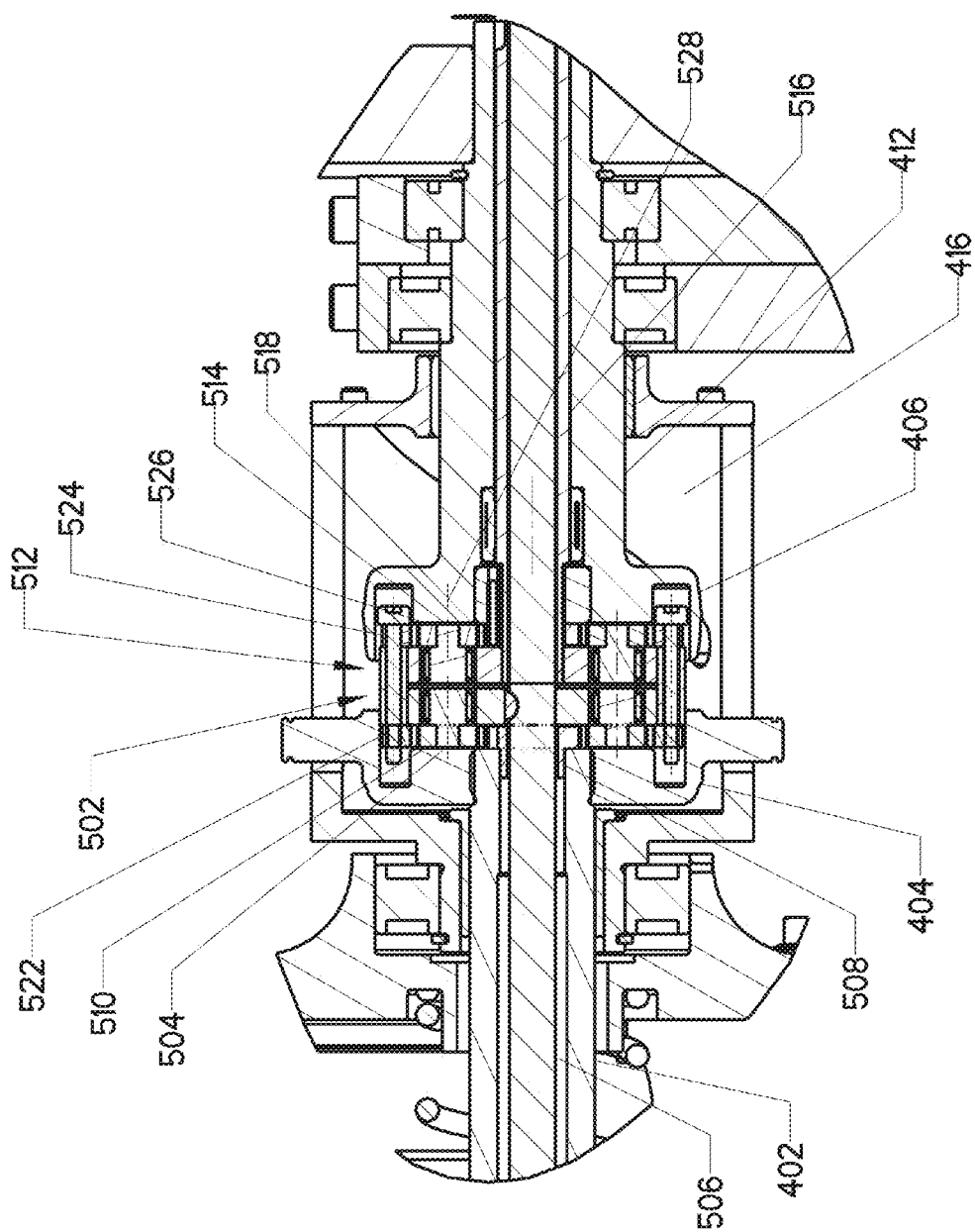
FIG. 13A is a cross-sectional side view of the of differential assembly of the CVT of FIG. 10.
Figure 13B:
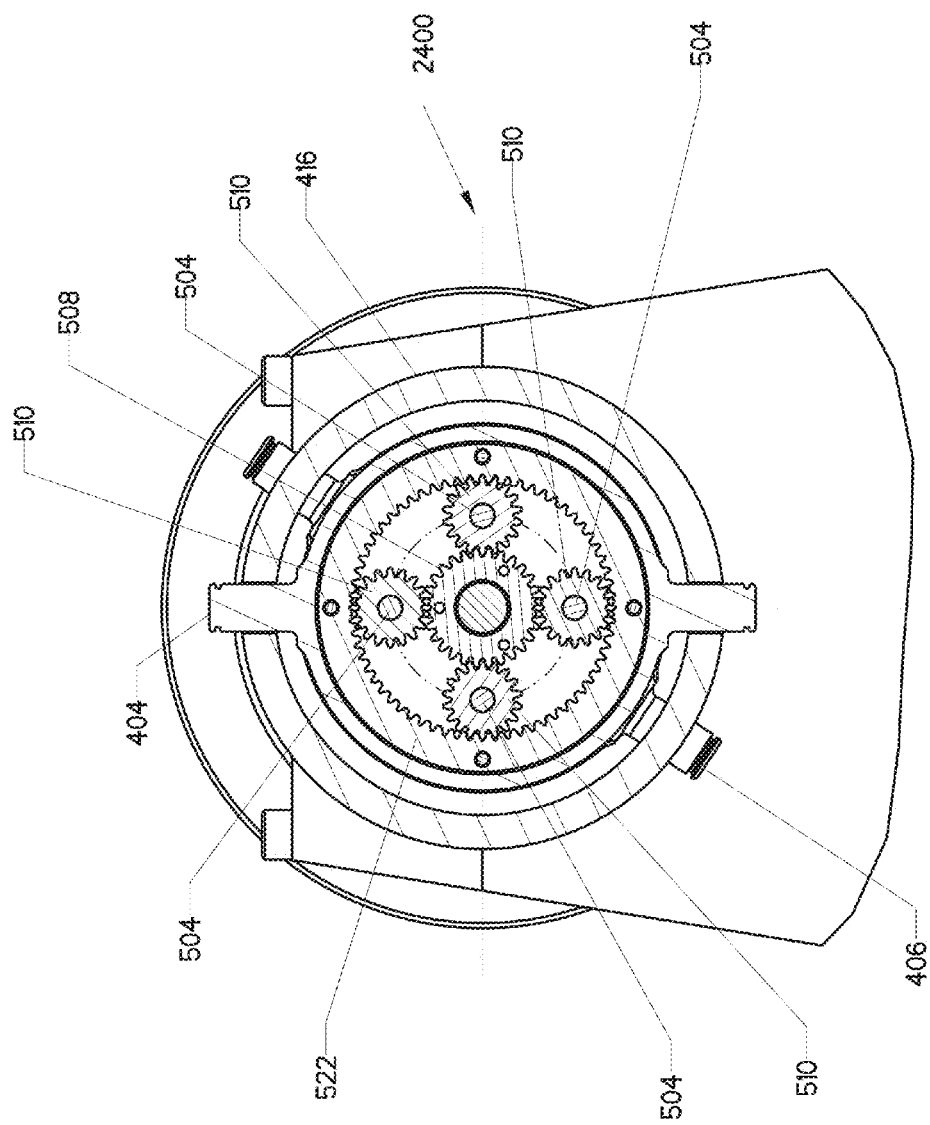
FIG. 13B is a cross-sectional front view of a differential assembly of the CVT of FIG. 10.

The torque feedback control assemblies 400, 1400 and 2400 are further illustrated in the cross-sectional side views of FIGS. 5A, 9A and 13A of their respective embodiment and the front cross-sectional views of FIGS. 5B, 9B and 13B of their respective embodiment. A first planetary 502 carrier 504 is operatively connected to the second stator 210 via shift shaft 506. The first sun gear 508 is operatively attached to the first spider 404 which is operatively connected to the CVT output shaft 402 which is in turn operatively connected to the second traction ring 204. The spider 404 rotates and transmits torque to the cam 416. A carrier 514 of a second planetary 512 is grounded via sleeve 516 so the carrier 514 does not rotate. A second sun gear 518 is operatively connected to the second spider 406. A ring gear 522 of the first planetary 502 and the ring gear 524 of the second planetary 512 are operatively connected and in practice could be one part. Planet gears 510 rotate freely about axis 524 of the first carrier 504. Planet gears 526 rotate freely about axis 528 of the second carrier 514. The previously described phase change that occurs between the first spider 404 and second spider 406 is therefore imparted on the double-planetary system 502 and 512 as described above. Each planetary 502 and 512 employs identical tooth count for each of the respective components. Given the arrangement described above, as the first planetary sun gear 508 rotates at the same rate as the second planetary sun gear 518, the first ring gear 522 rotates in the opposite direction as the first sun gear 508 at a rotational rate determined by the equation $$wRing = \frac{wSun - wCarrier*(1-k)}{k},$$

where $$k = -\frac{\text{Ring Gear Tooth Count}}{\text{Sun Gear Tooth Count}}$$

As the first ring gear 522 and second ring gear 524 are operatively connected, and as this gearing relationship is also true for the second planetary 512 as well as the first planetary 502, and as the second carrier 514 is rotationally locked to ground, the first carrier 504 will remain stationary. Additionally, if the first sun gear 508 and the second sun gear 518 rotate at a different rotational rate as they momentarily do during a cam 416 induced phase change, the first carrier 504 will correspondingly rotate relative to the second carrier 514 and thus experience a change in phase. Therefore, as the spiders 404 and 406 rotate and transmit torque, shaft 506 will remain stationary as long as the spiders 404 and 406 rotate together. Also, if due to the cam helix 410 of the cam 416, the relative phase of the two spiders 404 and 406 changes, a corresponding change in phase will occur between shaft 506 and ground (stationary reference) and in this case, sleeve 516 and the first stator 208. It is thus possible to use the phase relationship of the spiders 404 and 406 to control the rotation of shaft 506 and thus the shift control that controls the ratio of the system. The preferred embodiment has been shown and described. However, given identical corresponding tooth count of the gears in the first and second planetary, the mathematical relationship $$wRing = \frac{wSun - wCarrier*(1-k)}{k},$$

where $$k = -\frac{\text{Ring Gear Tooth Count}}{\text{Sun Gear Tooth Count}}$$

allows other similar arrangements. Specifically, any corresponding component may be tied together, the carriers 504 and 514, the ring gears 522 and 524 or the sun gears 508 and 518. The remaining components then must be utilized in the following manner: The first set of remaining planetary components will be respectively operatively connected to the first 404 and second 406 spiders. The remaining component pair will have one element operatively connected to ground (stationary) while the other will be operatively connected to the shift control shaft 506. The six possible combinations will each result in a different shift rotation direction and magnitude for a given spider phase change.

Figure 14A:
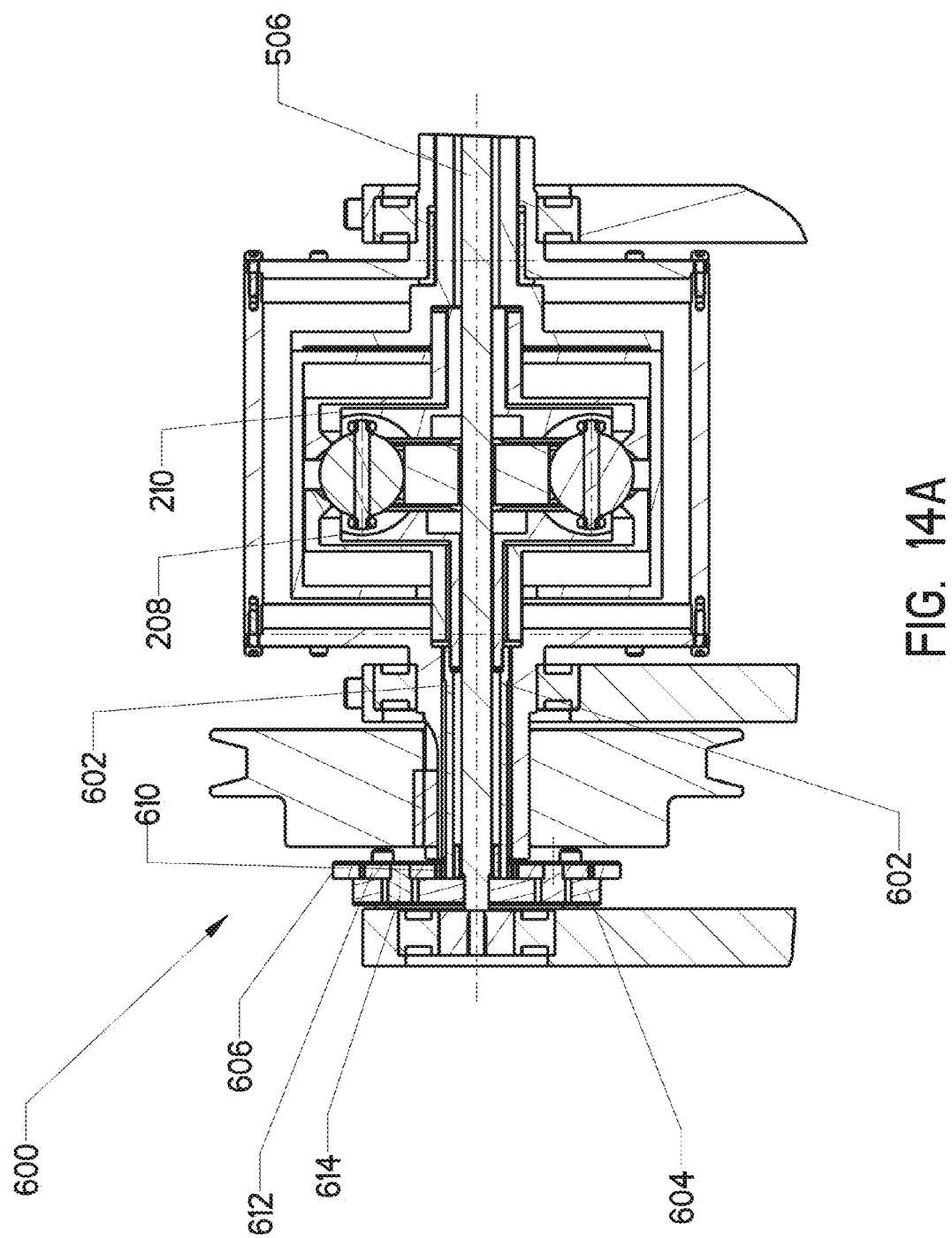
FIG. 14A is a cross-sectional side view of a planetary shift modifier assembly of FIG. 10.

CVT 2100 includes a planetary shift modifier assembly 600 that provides a rotational rate ratio between the shift control shaft 506 and 602. This is illustrated in the cross-sectional side view of the planetary shift modifier assembly 600 in FIG. 14A and the cross-sectional front view of a planetary shift modifier assembly 600 in FIG. 14B. Planetary shift modifier assembly 600 is part of the shifting mechanism that takes the shift control shaft 506 output of the differential assembly 500 to control the shifting mechanism inside the input/output planetary ratio assembly 200 of the CVT 2100. The carrier 604 of the planetary shift modifier assembly 600 is operatively connected to shaft 506. Ring gear 606 is operatively connected to ground, preventing relative rotation. In other embodiments, ring gear 606 may be operatively connected to an electrically controlled actuator. Planet gears 612 rotate freely on an axis 614 of the carrier 604. A single or plurality of planet gears may be employed with the same function. Sun gear 610 is operatively connected to the first stator 208. As stator 210 is operatively connected to shaft 506, rotation of the shaft 506 will result in a relative motion between stator 208 and 210 that is governed by the mathematical relationship:

$$wRing = \frac{wSun - wCarrier * (1-k)}{k},$$

where $$k = -\frac{\text{Ring Gear Tooth Count}}{\text{Sun Gear Tooth Count}}$$

Therefore, a phase change in the differential assembly 500 results in a corresponding ratio change in the input/output planetary ratio assembly 200.

In summary, as the two spiders 404 and 406 change phase between each other due to the cam helix 410 and axial position of the cam 416, they make shaft 506 rotate relative to ground. In embodiments, this rotation is used to create a relative rotational phase change between stators 208 and 210. In embodiments, shifting of the CVT 100 and 2100 is accomplished with a input speed feedback control assembly 300 and shifting of the CVT 3100 is accomplished with a input speed feedback control assembly 700 that uses rotational motion from an engine or other input to create an axial force that force balances with a torque feedback control assembly 400, 1400 or 2400 respectively that is operatively connected to the torque load, such as the tires of a vehicle. This shifting design has applications to other transmission devices such as an Infinitely Variable Transmission (IVT) of similar designs as well as a CVT system where the input and output are both coaxial to the CVT 200 and on the same side of the CVT 200.

Other embodiments include an embodiment where the double planetary of the differential assembly 500 is switched around. In one embodiment, the grounding connection may be in the first planetary assembly. The shift connection would then be in the second planetary assembly.

Figure 15:
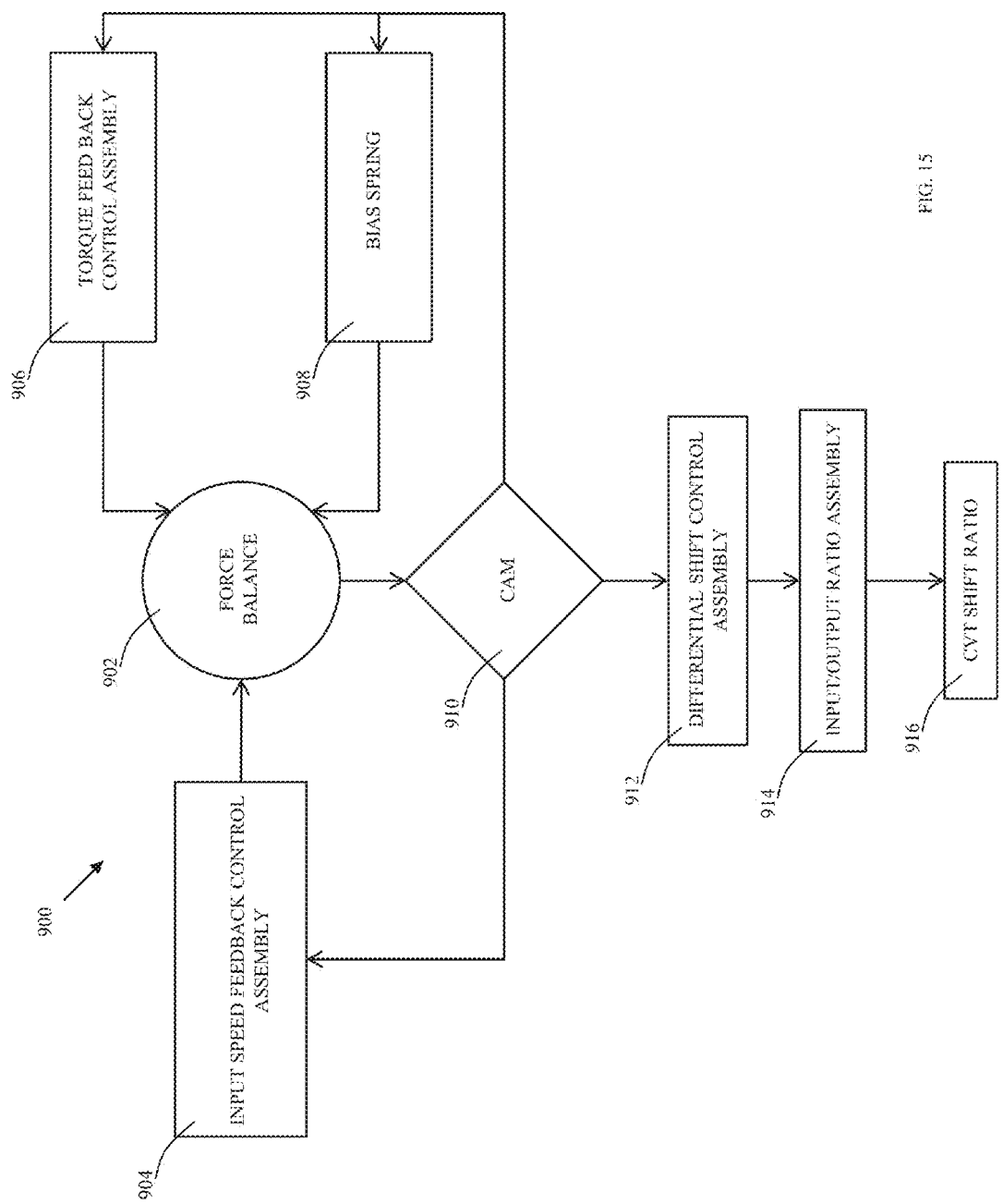
FIG. 15 is a functional block diagram of a CVT embodiment of the present invention.

Referring to FIG. 15, a functional block diagram of the CVTs 100, 1100 and 2100 is provided. Input speed feedback control assembly 904 produces a translational force as a linear or non-linear function of input shaft 110 rotational rate and as a constant, linear or non-linear function of translational position. Torque feedback control assembly 906 produces a translational force as a linear or non-linear function of output shaft 120 torque and as a constant, linear or non-linear function of translational position. Bias spring 908 produces a force as a constant, linear, or non-linear function of translational position. Translational force balance 902 outputs a translational position of cam 910 in accordance with the following equation:

Input Speed Feedback Control Assembly Force[Input Assembly 110 Rotational Speed, Translational Position]−Torque Feedback Control Assembly Force[Output Assembly 120 Torque, Translational Position]−Bias Spring Force[Translational Position]=0.

The input speed feedback control assembly 904, the torque feedback control assembly 906, the bias spring 908 and the cam 910 are translationally operatively connected. The translational position of cam 910 dictates the phase relationship of a matching pair of elements of two planetary gear-sets of a differential shift control assembly 912. In an embodiment, the elements are a matching pair of sun gears that operatively interface with the cam 910. Also, a first remaining pair of elements of a two planetary gear-set of the differential shift control assembly 912 are operatively coupled together. In this embodiment, the elements are a matching pair of ring gears. A remaining pair of elements are then arranged in the following manner A first element of a pair of elements is operatively connected to ground, while a second element outputs a rotational signal of the differential shift control assembly 912. Moreover, in this embodiment, these elements are a pair of carrier elements. This rotational signal is connected directly or indirectly to a first stator of an input/output planetary ratio assembly 914 causing rotation relative to a second stator of an input/output planetary ratio assembly 914. This in turn dictates a specific shift ratio of a CVT 916.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A continuously variable transmission comprising:
   an input assembly configured to be coupled to receive input rotational motion;
   an output assembly to provide a rotational output, the output assembly configured to be rotationally coupled to a load;
   an input/output planetary ratio assembly configured and arranged to set an input to output speed ratio, the input/output planetary ratio assembly having a first portion that is in rotational communication with the input assembly and a second portion that is in rotational communication with the output assembly;
   a torque feedback control assembly configured and arranged to provide an axial load force in response to a torque of the load coupled to the output assembly; and
   a differential assembly configured and arranged to set the input to output speed ratio of the input/output planetary ratio assembly based at least in part on the axial load force of the torque feedback control assembly.

2. The continuously variable transmission of claim 1, further comprising:
   an input speed feedback control assembly configured and arranged to provide an axial input force in response to a rotation from the input assembly; and
   the differential assembly configured and arranged to set the input to output speed ratio of the input/output planetary ratio assembly based on the balancing of the axial input force of the input speed feedback control assembly with the axial load force of the torque feedback control assembly.

3. The continuously variable transmission of claim 2, wherein the input speed feedback control assembly further comprises:

an input shaft operationally coupled to the input assembly;
an input speed feedback control assembly spider operationally coupled to the input shaft;
a moveable member slideably positioned along an axis of the input assembly; and
a shift weight configured and arranged to assert a shift weight force on the input speed feedback control assembly spider such that as the input speed feedback control assembly spins an axial shift weight force is generated to axially move the moveable member to create the axial input force.

4. The continuously variable transmission of claim 3, wherein the torque feedback control assembly further comprises:
an input/output ratio output shaft operationally coupled to the input/output planetary ratio assembly;
a cam slidably mounted on the input/output ratio shaft, the cam in operational communication with the movable member of the input speed feedback control assembly, the cam having at least one first track and at least one second track, the at least one first track being non-parallel with the at least one second track;
a first cam spider, the first cam spider operationally connected to the input/output ratio output shaft, at least a portion of the first cam spider received in the at least one first track of the cam, the first cam spider transmitting torque to the cam via the at least a portion of the first cam spider in the at least one first track;
a second cam spider, the second cam spider operationally connected to an output shaft of the output assembly, at least a portion of the second cam spider received in the at least one second track, wherein the second cam spider rotates relative to the first cam spider which operates in the at least one first track causing a phase change between first and second cam spiders when a change in axial position of the torque feedback control assembly occurs.

5. The continuously variable transmission of claim 4, wherein the at least one first track and the at least one second track include one of a straight track and a helix track.

6. The continuously variable transmission of claim 4, wherein the input/output planetary ratio assembly further comprises:
at least one ball planet; and
a first stator and a second stator, the ball planet received between the first stator and the second stator, the second stator configured to rotate in relation to the first stator to change the input to output speed ratio, the second stator coupled to the input/output ratio output shaft of the torque feedback control assembly such that a phase relationship between the first and second stator is tied to a phase relationship of the first and second cam spiders of the torque feedback control assembly.

7. The continuously variable transmission of claim 4, wherein the differential assembly further comprises:
a shift shaft that is operationally connected to the input/output planetary ratio assembly;
a first planetary assembly operationally connected to the shift shaft and the first cam spider of the torque feedback control assembly; and
a second planetary assembly, a portion of the second planetary assembly being rotationally grounded, the second planetary assembly further operationally connected to the second cam spider of the torque feedback control assembly.

8. The continuously variable transmission of claim 7, further comprising;
the first planetary assembly including,
a first planetary carrier operationally connected to the shift shaft,
a first ring gear, and
a first sun gear operationally connected to the first cam spider of the torque feedback control assembly; and
the second planetary assembly including,
a second planetary carrier that is rotationally grounded,
a second ring gear, the first ring gear operationally connected to the second ring gear, and
a second sun gear operationally connected to the second cam spider of the torque feedback control assembly.

9. The continuously variable transmission of claim 2, wherein the input speed feedback control assembly further comprises:
a hydraulic pump in rotational communication with the input assembly; and
a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly.

10. The continuously variable transmission of claim 9, wherein the input speed feedback control assembly further comprises:
a biasing member asserting a biasing force on the piston to bias the input/output planetary ratio assembly in a low ratio when the hydraulic pressure by the hydraulic pump has not reached the predetermined hydraulic pressure.

11. The continuously variable transmission of claim 9, wherein the torque feedback control assembly further comprises:
an input/output ratio output shaft operationally coupled to the input/output ratio assembly;
a cam slidably mounted on the input/output ratio output shaft, the cam in operational communication with the piston of the input speed feedback control assembly, the cam having at least one first track and at least one second track, the at least one first track being non-parallel with the at least one second track;
a first cam spider, the first cam spider operationally connected to the input/output ratio output shaft, at least a portion of the first cam spider received in the at least one first track of the cam, the first cam spider transmitting torque to the cam via the at least a portion of the first cam spider in the at least one first track;
a second cam spider, the second cam spider operationally connected to an output shaft of the output assembly, at least a portion of the second cam spider received in the at least one second track, wherein the second cam spider rotates relative to the first cam spider which operates in the at least one first track causing a phase change between first and second cam spiders when a change in axial position of the torque feedback control assembly occurs.

12. The continuously variable transmission of claim 11, wherein the differential assembly further comprises:
a shift shaft that is operationally connected to the input/output planetary ratio assembly;
a first planetary assembly operationally connected to the shift shaft and the first cam spider of the torque feedback control assembly; and
a second planetary assembly, a portion of the second planetary assembly being rotationally grounded, the second planetary assembly further operationally connected to the second cam spider of the torque feedback control assembly.

13. The continuously variable transmission of claim 11, wherein the input/output planetary ratio assembly further comprises:
    at least one ball planet; and
    a first stator and a second stator, the ball planet received between the first stator and the second stator, the second stator configured to rotate in relation to the first stator to change the input to output speed ratio, the second stator coupled to the input/output ratio output shaft of the torque feedback control assembly such that a phase relationship between the first and second stator is tied to a phase relationship of the first and second cam spiders of the torque feedback control assembly.

14. A continuously variable transmission comprising:
    an input assembly configured to be coupled to receive input rotational motion;
    an output assembly to provide a rotational output, the output assembly configured to be rotationally coupled to a load;
    an input/output planetary ratio assembly configured and arranged to set an input to output speed ratio, the input/output planetary ratio assembly having a first portion that is in rotational communication with the input assembly and a second portion that is in rotational communication with the output assembly;
    a torque feedback control assembly configured and arranged to provide an axial load force in response to a torque of the load coupled to the output assembly, the torque feedback control assembly coupled to provide torque feedback to the input/output planetary ratio assembly to at least in part control the input to output speed ratio of the input/output planetary ratio assembly;
    an input speed feedback control assembly configured and arranged to provide an axial input force in response to a rotation from the input assembly; and
    a differential assembly configured and arranged to set the input to output speed ratio of the input/output planetary ratio assembly based on the balancing of the axial input force of the input speed feedback control assembly with the axial load force of the torque feedback control assembly.

15. The continuously variable transmission of claim 14, wherein the input speed feedback control, assembly further comprises:
    an input shaft operationally coupled to the input assembly;
    an input speed feedback control assembly spider operationally coupled to the input shaft;
    a moveable member slideably positioned along an axis of the input assembly; and
    a shift weight configured and arranged to assert a shift weight force on the input speed feedback control assembly spider such that as the input speed feedback control assembly spins an axial shift weight force is generated to axially move the moveable member along to create the axial input force.

16. The continuously variable transmission of claim 15, wherein the torque feedback control assembly further comprises:
    an input/output ratio output shaft operationally coupled to the input/output planetary ratio assembly;
    a cam slidably mounted on the input/output ratio output shaft, the cam in operational communication with the movable member of the input speed feedback control assembly, the cam having at least one first track and at least one second track, the at least one first track being non-parallel with the at least one second track;
    a first cam spider, the first cam spider operationally connected to the input/output ratio output shaft, at least a portion of the first cam spider received in the at least one first track of the cam, the first cam spider transmitting torque to the cam via the at least a portion of the first cam spider in the at least one first track;
    a second cam spider, the second cam spider operationally connected to an output shaft of the output assembly, at least a portion of the second cam spider received in the at least one second track, wherein the second cam spider rotates relative to the first cam spider which operates in the at least one first track causing a phase change between first and second cam spiders when a change in axial position of the torque feedback control assembly occurs.

17. The continuously variable transmission of claim 16, wherein the differential assembly further comprises:
    a shift shaft that is operationally connected to the input/output planetary ratio assembly;
    a first planetary assembly operationally connected to the shift shaft and the first cam spider of the torque feedback control assembly; and
    a second planetary assembly, a portion of the second planetary assembly being rotationally grounded, the second planetary assembly further operationally connected to the second cam spider of the torque feedback control assembly.

18. The continuously variable transmission of claim 14, wherein the input speed feedback control assembly further comprises:
    a hydraulic pump in rotational communication with the input assembly; and
    a piston in fluid communication with the hydraulic pump, the piston further in mechanical communication with the torque feedback control assembly such that a hydraulic pressure over a predetermined hydraulic pressure from the hydraulic pump moves the piston therein effecting the torque feedback control assembly.

19. A continuously variable transmission comprising:
    an input assembly configured to be coupled to receive input rotational motion;
    an output assembly to provide a rotational output, the output assembly configured to be rotationally coupled to a load;
    an input/output planetary ratio assembly configured and arranged to set an input to output speed ratio, the input/output planetary ratio assembly having a first portion that is in rotational communication with the input assembly and a second portion that is in rotational communication with the output assembly;
    a torque feedback control assembly configured and arranged to provide an axial load force in response to a torque of the load coupled to the output assembly, the torque feedback control assembly coupled to provide torque feedback to the input/output planetary ratio assembly to at least in part control the input to output speed ratio of the input/output planetary ratio assembly, the torque feedback control assembly further including,
        an input/output ratio output shaft operationally coupled to the input/output planetary ratio assembly;
        a cam slidably mounted on the input/output ratio output shaft, the cam in operational communication with a movable member of an input speed feedback control assembly, the cam having at least one first track and at least one second track, the at least one first track being non-parallel with the at least one second track;

a first cam spider, the first cam spider operationally connected to the input/output ratio output shaft, at least a portion of the first cam spider received in the at least one first track of the cam, the first cam spider transmitting torque to the cam via the at least a portion of the first cam spider in the at least one first track; and a second cam spider, the second cam spider operationally connected to an output shaft of the output assembly, at least a portion of the second cam spider received in the at least one second track, wherein the second cam spider rotates relative to the first cam spider which operates in the at least one first track causing a phase change between first and second cam spiders when a change in axial position of the torque feedback control assembly occurs.

20. The continuously variable transmission of claim 19, further comprising:

the input speed feedback control assembly configured and arranged to provide an axial input force in response to a rotation from the input assembly; and a differential assembly configured and arranged to set the input to output speed ratio of the input/output planetary ratio assembly based on the balancing of the axial input of the input speed feedback control assembly force with the axial load force of the torque feedback control assembly.

21. The continuously variable transmission of claim 20, wherein the differential assembly further comprises:

a shift shaft that is operationally connected to the input/output planetary ratio assembly;

a first planetary assembly operationally connected to the shift shaft and the first cam spider of the torque feedback control assembly; and a second planetary assembly, a portion of the second planetary assembly being rotationally grounded, the second planetary assembly further operationally connected to the second cam spider of the torque feedback control assembly.

* * * * *